United States Patent
Ota et al.

(10) Patent No.: US 9,766,430 B2
(45) Date of Patent: Sep. 19, 2017

(54) IMAGING LENS AND IMAGING APPARATUS EQUIPPED WITH THE IMAGING LENS

(71) Applicant: FUJIFILM Corporation, Tokyo (JP)

(72) Inventors: Motoari Ota, Saitama-ken (JP); Masato Kondo, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 238 days.

(21) Appl. No.: 14/644,634

(22) Filed: Mar. 11, 2015

(65) Prior Publication Data
US 2015/0260954 A1 Sep. 17, 2015

(30) Foreign Application Priority Data
Mar. 13, 2014 (JP) ................................. 2014-049985

(51) Int. Cl.
*G02B 9/60* (2006.01)
*G02B 9/62* (2006.01)
*G02B 13/00* (2006.01)

(52) U.S. Cl.
CPC ............ *G02B 9/62* (2013.01); *G02B 13/0045* (2013.01)

(58) Field of Classification Search
CPC ..................... G02B 13/0045; G02B 9/60–9/64
USPC ................................................. 359/757–758
See application file for complete search history.

(56) References Cited

U.S. PATENT DOCUMENTS

| | | | | |
|---|---|---|---|---|
| 5,790,324 A | * | 8/1998 | Park ....................... | G02B 13/06 359/751 |
| 2001/0024332 A1 | * | 9/2001 | Mori ...................... | G02B 13/04 359/755 |
| 2013/0314804 A1 | * | 11/2013 | Kubota .............. | G02B 13/0015 359/757 |
| 2014/0204478 A1 | * | 7/2014 | Asami .................... | G02B 13/06 359/752 |
| 2014/0254029 A1 | | 9/2014 | Hsu et al. | |
| 2014/0368927 A1 | | 12/2014 | Hsu et al. | |
| 2015/0070783 A1 | * | 3/2015 | Hashimoto ........ | G02B 13/0045 359/708 |
| 2015/0168692 A1 | * | 6/2015 | Kitahara ............ | G02B 13/0045 359/752 |
| 2015/0338611 A1 | * | 11/2015 | Jung .................. | G02B 13/0045 359/713 |
| 2016/0313536 A1 | * | 10/2016 | Kubota .............. | G02B 13/0045 |

FOREIGN PATENT DOCUMENTS

| | | |
|---|---|---|
| JP | 2013-182090 | 9/2013 |
| TW | 201331617 | 8/2013 |

* cited by examiner

*Primary Examiner* — Bumsuk Won
*Assistant Examiner* — Jeffrey Madonna
(74) *Attorney, Agent, or Firm* — Young & Thompson

(57) ABSTRACT

An imaging lens is constituted essentially by six lenses, including: a first lens having a positive refractive power and is of a meniscus shape with a convex surface toward the object side; a second lens having a negative refractive power; a third lens; a fourth lens having a positive refractive power; a fifth lens having a negative refractive power and a concave surface toward the image side; and a sixth lens of a biconcave shape, provided in this order from the object side. The imaging lens satisfies a predetermined conditional formula.

17 Claims, 12 Drawing Sheets

IMAGING LENS AND IMAGING APPARATUS EQUIPPED WITH THE IMAGING LENS

CROSS REFERENCE TO RELATED APPLICATIONS

The present application claims priority under 35 USC §119 to Japanese Patent Application No. 2014-049985 filed on Mar. 13, 2014. The above application is hereby expressly incorporated by reference in its entirety, into the present application.

TECHNICAL FIELD

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

BACKGROUND ART

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, have been proposed, and imaging lenses having a six lens configuration, which is an even greater number of lenses, have been proposed for further improvements in performance. For example, Japanese Unexamined Patent Publication No. 2013-182090 and Taiwanese Patent Publication No. 201331617 disclose imaging lenses having six lens configurations.

DISCLOSURE OF THE INVENTION

Meanwhile, there is demand for imaging lenses having comparatively short total lengths for use in apparatuses such as portable terminals, smart phones, and tablet type terminals in particular to realize wider angles of view and smaller F numbers in addition to shorter total lengths, in order to be compatible with imaging elements having large image sizes that satisfy demand for an increased number of pixels.

However, the F number of the imaging lens disclosed in Japanese Unexamined Patent Publication No. 2013-182090 is too large to meet the above demand, and the angle of view thereof is too narrow. In addition, a further shortening of the total length of the imaging lens disclosed in Japanese Unexamined Patent Publication No. 2013-182090 is required. Further, it is difficult for the imaging lens disclosed in Taiwanese Patent Publication No. 201331617 to simultaneously satisfy all of the above demands.

The present invention has been developed in view of the foregoing points. The object of the present invention is to provide an imaging lens that can achieve a shortening of the total length, a wide angle of view, and a small F number, and realizes high imaging performance from a central angle of view to peripheral angles of view. It is another object of the present invention to provide an imaging apparatus equipped with the imaging lens, which is capable of obtaining high resolution photographed images.

An imaging lens of the present invention consists essentially of six lenses, including:

a first lens having a positive refractive power and is of a meniscus shape with a convex surface toward the object side;

a second lens having a negative refractive power;

a third lens;

a fourth lens having a positive refractive power;

a fifth lens having a negative refractive power and a concave surface toward the image side; and a sixth lens of a biconcave shape, provided in this order from the object side;

the imaging lens satisfying the following conditional formula:

$$-0.25 < f/f3 < 1 \quad (1)$$

wherein f is the focal length of the entire system, and f3 is the focal length of the third lens.

Note that in the imaging lens of the present invention, the expression "consists essentially of six lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the six lenses. In addition, the shapes of the surfaces of the lenses and the signs of the refractive indices thereof are considered in the paraxial region in the case that the lenses include aspherical surfaces.

The optical performance of the imaging lens of the present invention can be further improved by adopting the following favorable configurations.

It is preferable for the imaging lens of the present invention to further be equipped with an aperture stop positioned at the object side of the surface of the first lens toward the object side.

The imaging lens of the present invention may satisfy one or arbitrary combinations of Conditional Formulae (1-1) and (1-2), Conditional Formulae (2) and (2-1), Conditional Formulae (3) and (3-1), Conditional Formulae (4) and (4-1), Conditional Formulae (5) and (5-1), Conditional Formulae (6) and (6-1), Conditional Formulae (7) and (7-1), and Conditional Formulae (8) and (8-1) below.

$$-0.24 < f/f3 < 0.8 \quad (1\text{-}1)$$

$$-0.23 < f/f3 < 0.46 \quad (1\text{-}2)$$

$$-3.5 < f/f5 < 0 \quad (2)$$

$$-2.5 < f/f5 < 0 \quad (2\text{-}1)$$

$$-4 < f4/f5 < 0 \quad (3)$$

$$-2<f4/f5<0 \quad (3\text{-}1)$$

$$-2<f/f2<0 \quad (4)$$

$$-1<f/f2<-0.3 \quad (4\text{-}1)$$

$$0<f/f4<3 \quad (5)$$

$$0.8<f/f4<2.5 \quad (5\text{-}1)$$

$$0.7<f/f1<2 \quad (6)$$

$$0.81<f/f1<1.5 \quad (6\text{-}1)$$

$$-3<f\cdot P34<0 \quad (7)$$

$$-1.5<f\cdot P34<-0.2 \quad (7\text{-}1)$$

$$-10<(L4r+L4)/(L4r-L4)<4 \quad (8)$$

$$-5<(L4r+L4f)/(L4r-L4f)<0 \quad (8\text{-}1)$$

wherein f is the focal distance of the entire system, f1 is the focal length of the first lens, f2 is the focal length of the second lens, f3 is the focal length of the third lens, f4 is the focal length of the fourth lens, f5 is the focal length of the fifth lens, L4f is the paraxial radius of curvature of the surface of the fourth lens toward the object side, L4r is the paraxial radius of curvature of the surface of the fourth lens toward the image side, and P34 is the refractive power of an air lens formed between the surface of the third lens toward the image side and the surface of the fourth lens toward the object side, the refractive power of the air lens being obtained by Formula (P) below:

$$P34 = \frac{1-Nd3}{L3r} + \frac{Nd4-1}{L4f} - \frac{(1-Nd3)\times(Nd4-1)\times D7}{L3r \times L4f} \quad (P)$$

wherein Nd3 is the refractive index of the third lens with respect to the d line, Nd4 is the refractive index of the fourth lens with respect to the d line, L3r is the paraxial radius of curvature of the surface of the third lens toward the image side, L4f is the paraxial radius of curvature of the surface of the fourth lens toward the object side, and D7 is an air space distance between the third lens and the fourth lens along the optical axis.

An imaging apparatus of the present invention is equipped with the imaging lens of the present invention.

According to the imaging lens of the present invention, the configuration of each lens element, and particularly the first, second, and fourth through sixth lenses is optimized, within a lens configuration having six lenses as a whole. Therefore, a lens system that can achieve a short total length and a while angle of view while being compatible with an increased number of pixels and has high imaging performance from a central angle of view to peripheral angles of view can be realized.

The imaging apparatus of the present invention is equipped with any one of the imaging lenses of the present invention having high imaging performance. Therefore, the imaging apparatus of the present invention is capable of obtaining high resolution photographed images.

BEST MODE FOR CARRYING OUT THE INVENTION

Hereinafter, embodiments of the present invention will be described in detail with reference to the attached drawings.

Figure 1:
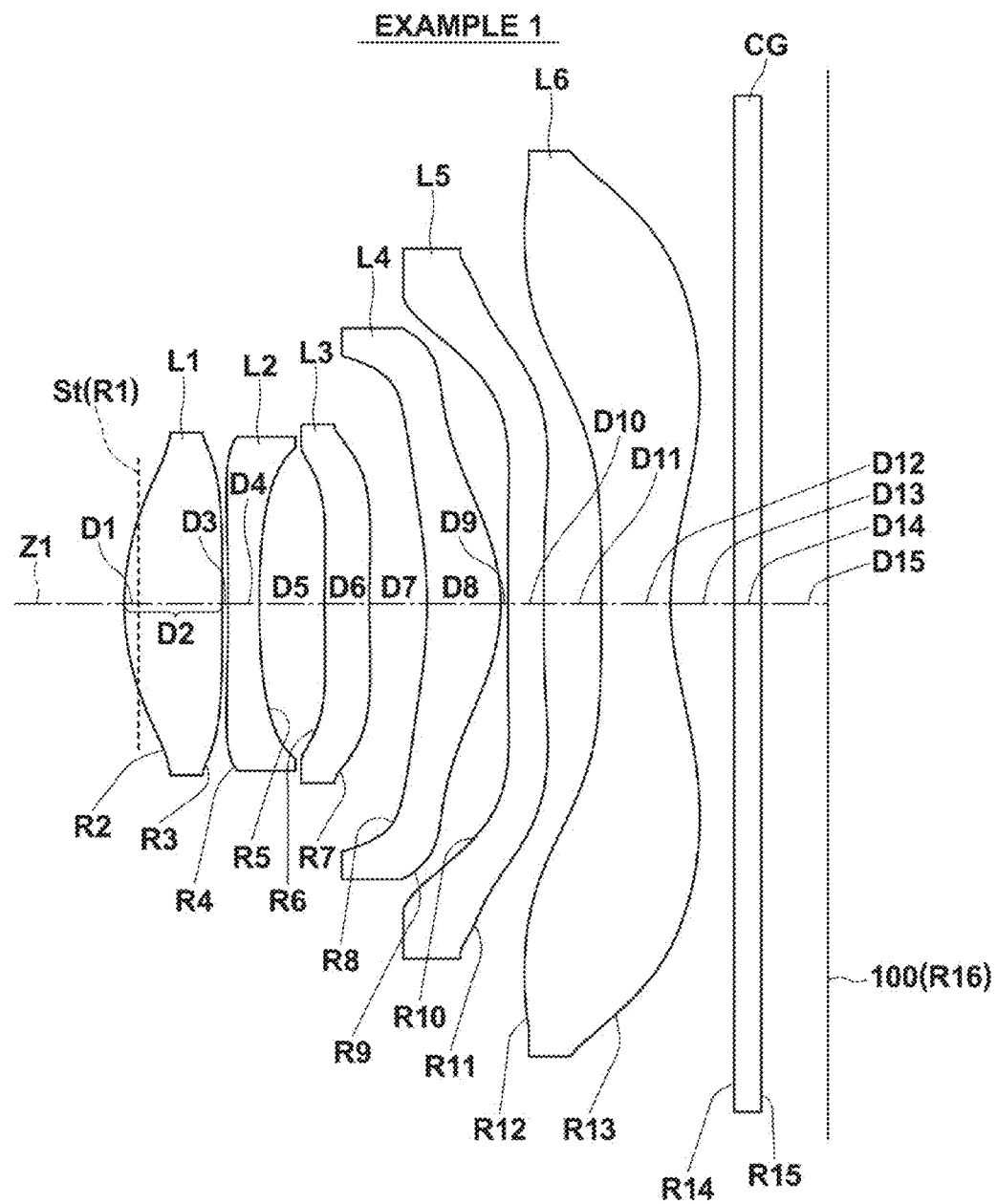
FIG. 1 is a sectional diagram that illustrates a first example of the configuration of an imaging lens according to an embodiment of the present invention, and corresponds to a lens of Example 1.
Figure 2:
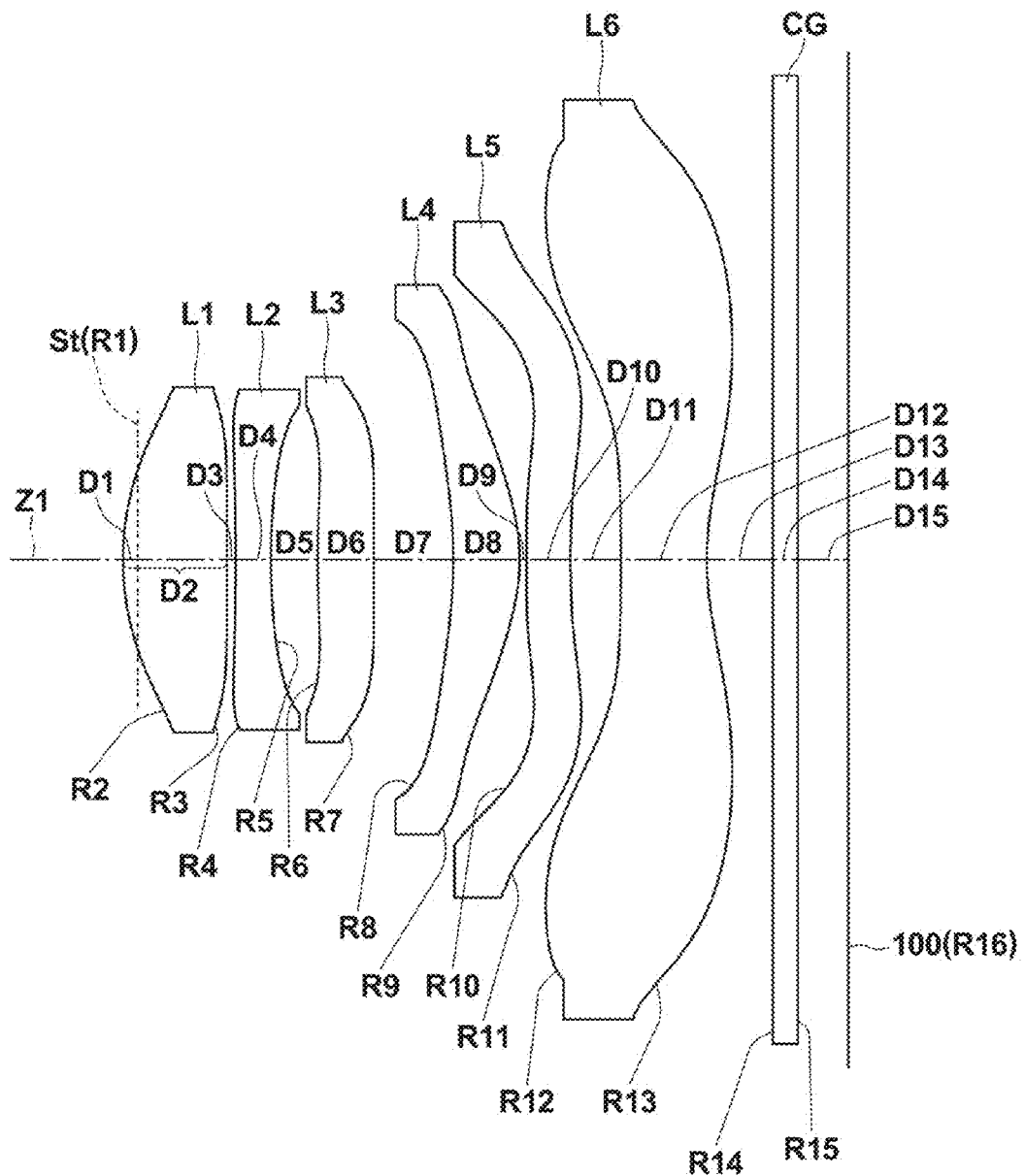
FIG. 2 is a sectional diagram that illustrates a second example of the configuration of an imaging lens according to an embodiment of the present invention, and corresponds to a lens of Example 2.
Figure 3:
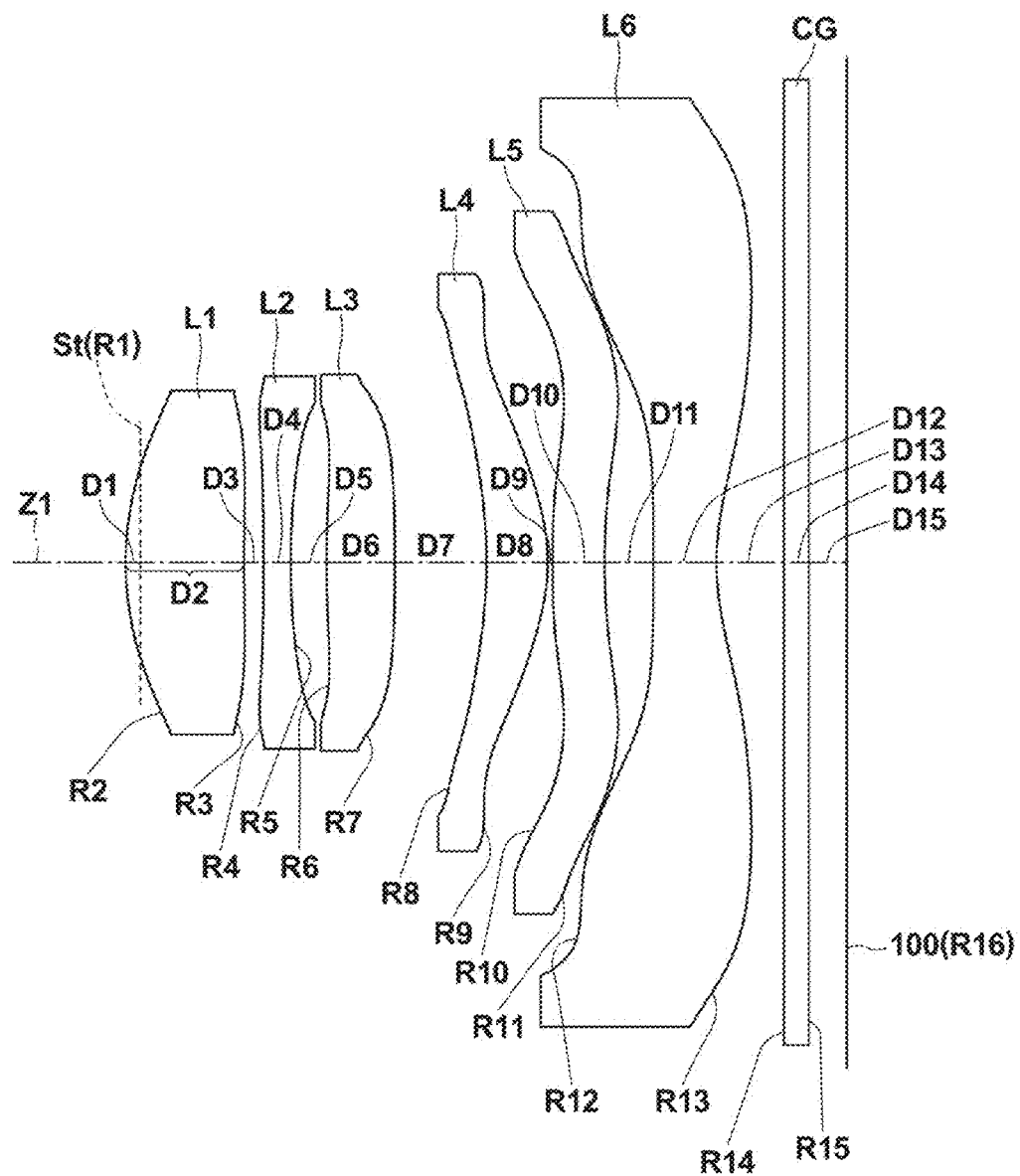
FIG. 3 is a sectional diagram that illustrates a third example of the configuration of an imaging lens according to an embodiment of the present invention, and corresponds to a lens of Example 3.
Figure 4:
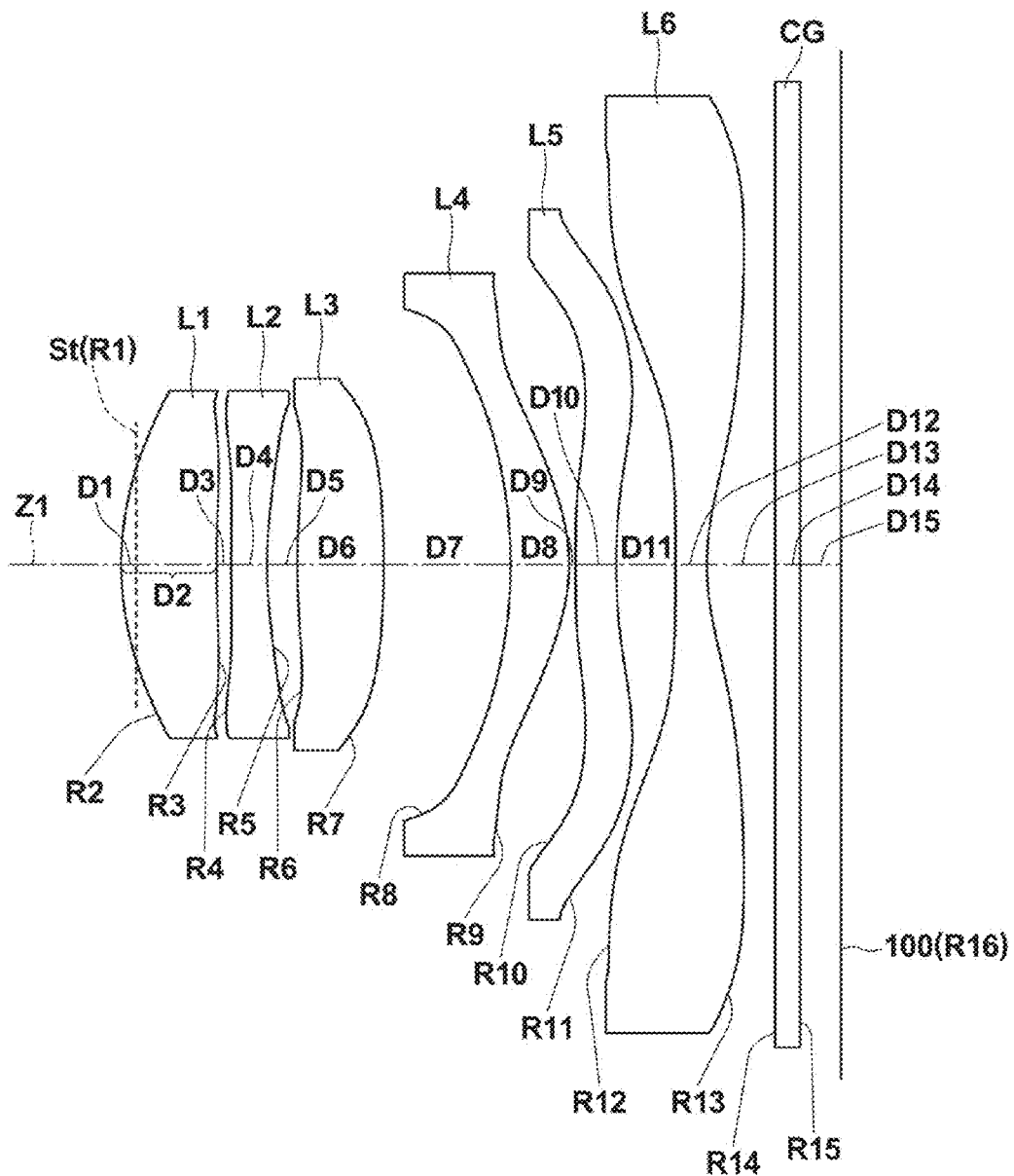
FIG. 4 is a sectional diagram that illustrates a fourth example of the configuration of an imaging lens according to an embodiment of the present invention, and corresponds to a lens of Example 4.
Figure 5:
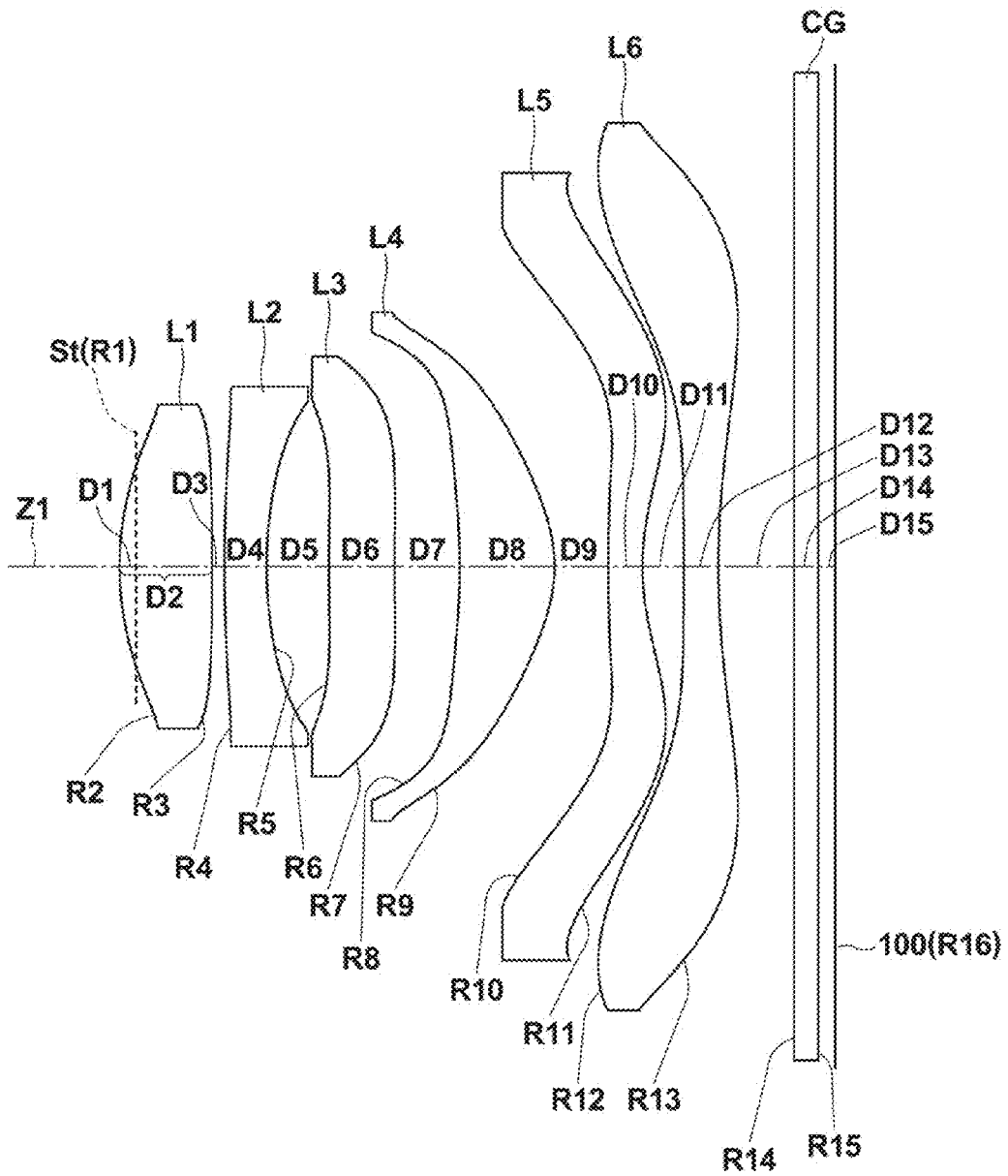
FIG. 5 is a sectional diagram that illustrates a fifth example of the configuration of an imaging lens according to an embodiment of the present invention, and corresponds to a lens of Example 5.
Figure 6:
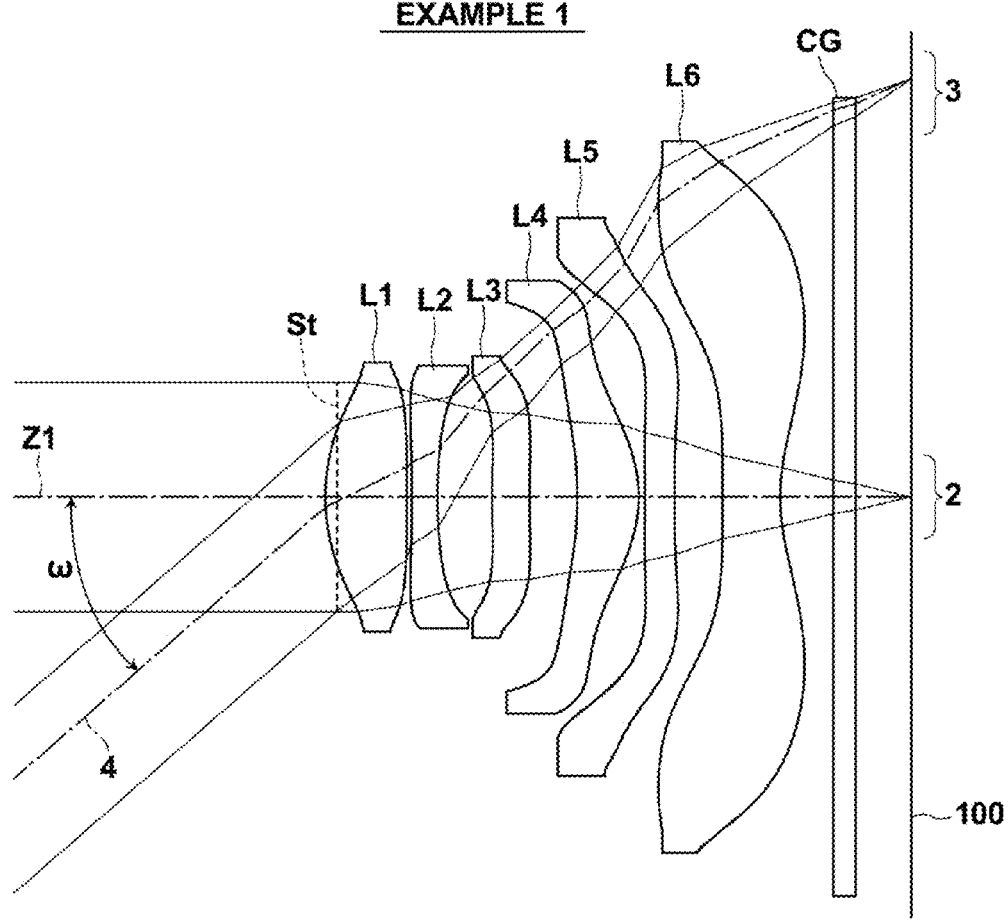
FIG. 6 is a diagram that illustrates the paths of light rays that pass through the imaging lens of FIG. 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 5 are sectional diagrams that illustrate second through seventh examples of lens configurations that correspond to Numerical Examples 2 through 5 (Table 3 through Table 10). In FIG. 1 through FIG. 5, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 5 will also be described as necessary. In addition, FIG. 6 is a diagram that illustrates the paths of light rays that pass through the imaging lens L of FIG. 1. FIG. 6 illustrates the paths of axial light beams 2 and maximum angle of view light beams 3 from an object at a distance of infinity, and a half value ω of a maximum angle of view. Note that a principal light ray 4 of the maximum angle of view light beams 3 is indicated by a single dot chained line.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, a fifth lens L5, and a sixth lens L6, provided along the optical axis Z1 in this order from the object side.

Figure 12:
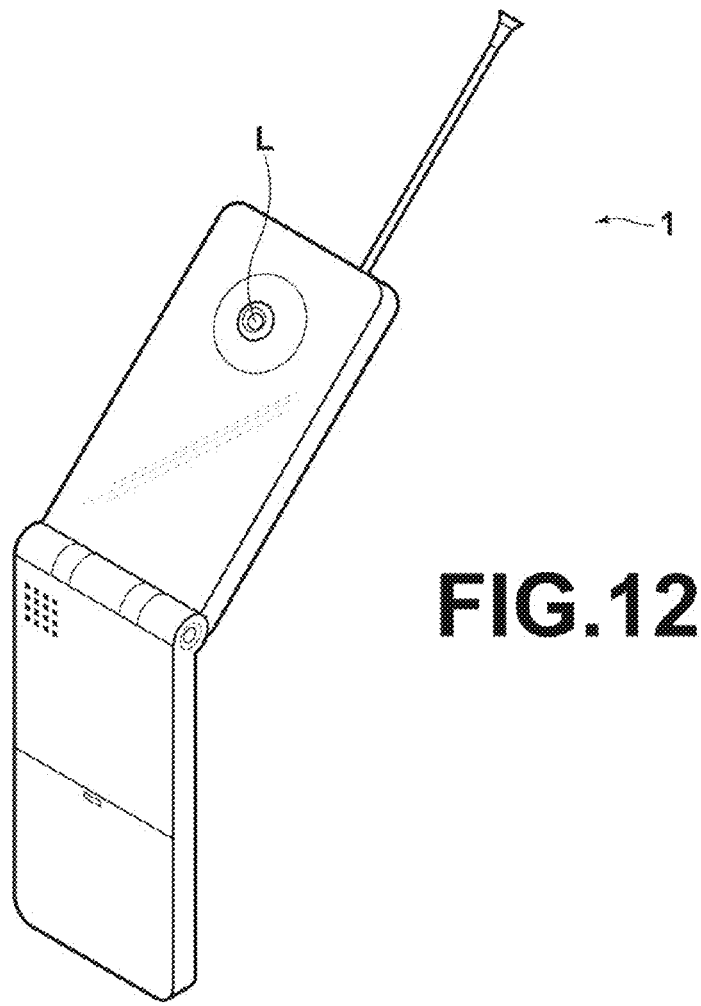
FIG. 12 is a diagram that illustrates a cellular telephone as an imaging apparatus equipped with the imaging lens of the present invention.

FIG. 12 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface R16 in FIG. 1 through FIG. 5) of the imaging lens L.

Figure 13:
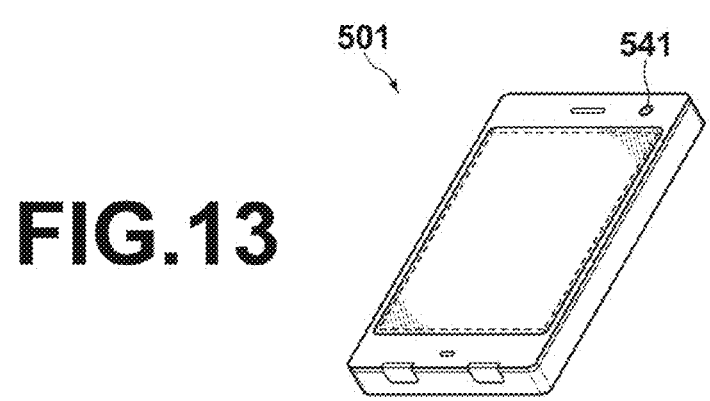
FIG. 13 is a diagram that illustrates a smart phone as an imaging apparatus equipped with the imaging lens of the present invention.

FIG. 13 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface) of the imaging lens L.

Various optical members CG may be provided between the sixth lens L6 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG Alternatively, the optical member CG may be omitted, and a coating may be administered on the sixth lens L6 to obtain the same effect as that of the optical member CG. In this case, the number of parts can be reduced, and the total length can be shortened.

It is preferable for the imaging lens L to be equipped with an aperture stop St positioned at the object side of the surface of the first lens L1 toward the object side. In the case that the aperture stop St is positioned at the object side of the surface of the first lens L1 toward the object side in this manner, increases in the incident angles of light rays that pass through the optical system and enter the image formation plane (imaging element) can be suppressed, particularly at peripheral portions of an imaging region. Note that the expression "positioned at the object side of the surface of the first lens L1 toward the object side" means that the position of the aperture stop in the direction of the optical axis is at the same position as the intersection of marginal axial rays of light and the surface of the first lens L1 toward the object side, or more toward the object side than this position. In the embodiments, the lenses of the first through fifth Examples (FIGS. 1 through 5) are examples in which the aperture stop St is positioned at the object side of the first lens L1. Note that the aperture stops St illustrated in the figures do not necessarily represent the sizes or shapes thereof, but indicate the positions thereof on the optical axis Z1.

In the imaging lens L, the first lens L1 has a positive refractive power in the vicinity of the optical axis. This configuration is advantageous from the viewpoint of shortening the total length of the lens. In addition, the first lens L1 is be of a meniscus shape having a convex surface toward the object side in the vicinity of the optical axis. For this reason, moving the position of the rearward principal point of the first lens L1 toward the object side is facilitated, and a shortening of the total length of the lens can be more favorably realized.

The second lens L2 has a negative refractive power in the vicinity of the optical axis. Thereby, longitudinal chromatic aberration and spherical aberration can be favorably corrected. In addition, it is preferable for the second lens L2 to have a concave surface toward the image side in the vicinity of the optical axis. In this case, moving the position of the rearward principal point of the second lens L2 toward the object side is facilitated, and a shortening of the total length of the lens can be favorably realized. Alternatively, the second lens L2 may be of a meniscus shape having a concave surface toward the image side in the vicinity of the optical axis. In this case, the total length of the lens can be more favorably shortened. As a further alternative, the second lens L2 may be of a biconcave shape in the vicinity of the optical axis. In this case, the negative refractive power of the second lens L2 can be sufficiently secured, and various aberrations which are generated at the first lens L1 having a positive refractive power can be favorably corrected. Such a configuration is advantageous from the viewpoint of shortening the total length of the lens.

The third lens L3 may have a positive refractive power in the vicinity of the optical axis or a negative refractive power in the vicinity of the optical axis, as long as it is capable of realizing desired performance. In the case that the third lens L3 has a positive refractive power in the vicinity of the optical axis, spherical aberration can be favorably corrected. In the case that the third lens L3 has a negative refractive power in the vicinity of the optical axis, such a configuration is advantageous from the viewpoint of correcting longitudinal chromatic aberration and lateral chromatic aberration. In addition, the third lens L3 may be of a biconvex shape in the vicinity of the optical axis. In this case, spherical aberration can be favorably corrected. Alternatively, the third lens L3 may be of a meniscus shape having a convex surface toward the object side in the vicinity of the optical axis. In this case, moving the position of the rearward principal point of the third lens L3 toward the object side is facilitated, and a shortening of the total length of the lens can be favorably realized.

In addition, the fourth lens L4 has a positive refractive power in the vicinity of the optical axis. Thereby, a shortening of the total length of the lens can be favorably realized. In addition, it is preferable for the fourth lens L4 to be of a meniscus shape having a convex surface toward the object side in the vicinity of the optical axis. In this case, the incident angles of light rays that enter the surface of the fourth lens L4toward the object side can be decreased, and the generation of various aberrations can be suppressed. For this reason, distortion, lateral chromatic aberration, and astigmatism, which will become likely to be generated accompanying a shortening of the total length of the lens, can be favorably corrected.

The fifth lens L5 has a negative refractive power in the vicinity of the optical axis. Here, if the first lens L1 through the fourth lens L4 are considered to be a positive first lens group, and the fifth lens L5 and the sixth lens L6 are considered to be a negative second lens group, the imaging lens L will have a telephoto type configuration. For this reason, the second lens group constituted by the fifth lens L5and the sixth lens L6 can be configured to have a sufficient negative refractive power by distributing negative refractive power between the fifth lens L5 and the sixth lens L6, and the total length of the lens can be favorably shortened. In addition, the fifth lens L5 has a concave surface toward the image side in the vicinity of the optical axis. Thereby, a shortening of the total length of the lens can be more favorably realized. In addition, the fifth lens L5 may be of a biconcave shape in the vicinity of the optical axis. In this case, correction of astigmatism is facilitated by the fifth lens L5 having a concave surface toward the object side, which is advantageous from the viewpoint of widening the angle of view. Alternatively, the fifth lens L5 may be of a meniscus shape having a concave surface toward the image side in the vicinity of the optical axis. Such a configuration is more advantageous from the viewpoint of shortening the total length of the lens.

The sixth lens L6 has a negative refractive power in the vicinity of the optical axis. Thereby, moving the rearward principal point of the imaging lens L toward the object side is facilitated, and a shortening of the total length of the lens can be favorably realized. In addition, field curvature can be favorably corrected, by the sixth lens L6having a negative refractive power in the vicinity of the optical axis. In addition, the sixth lens L6 has a concave surface toward the image side in the vicinity of the optical axis. For this reason, field curvature can be favorably corrected, while favorably realizing a shortening of the total length.

In addition, the sixth lens L6 is of a biconcave shape in the vicinity of the optical axis. For this reason, excessive increases in the burden of negative refractive power on each surface of the sixth lens L6 can be suppressed, by the negative refractive power of the sixth lens L6 being secured by both the surface of the sixth lens L6 toward the object side and the surface of the sixth lens L6 toward the image side. Therefore, astigmatism can be favorably corrected, and increases in the incident angle of light rays that pass through the optical system and enter the image formation plane (imaging element) can be suppressed, particularly at intermediate angles of view.

In addition, it is preferable for the surface of the sixth lens L6 toward the image side to be of an aspherical shape having at least one inflection point at a position in an inwardly radial direction from the intersection of a principal light ray at a maximum angle of view and the surface of the sixth lens L6 toward the image side to the optical axis. By adopting this configuration, increases in the incident angles of light rays that pass through the optical system at and enter the image formation plane (imaging element) can be suppressed, particularly at the peripheral portions of the imaging region. In addition, distortion can be favorably corrected, by the surface of the sixth lens L6toward the image side being of an aspherical shape having at least one inflection point at a position in an inwardly radial direction from the intersection of a principal light ray at a maximum angle of view and the surface of the sixth lens L6 toward the image side to the optical axis. Note that the "inflection point" on the surface of the sixth lens L6toward the image side refers to a point at which the shape of the surface of the sixth lens L6 toward the image side changes from a convex shape to a concave shape (or from a concave shape to a convex shape) with respect to the image side. In addition, in the present specification, the expression "a position in an inwardly radial direction from the intersection of a principal light ray at a maximum angle of view and the surface toward the image side to the optical axis" refers to positions at the intersection of a principal light ray at a maximum angle of view and the surface toward the image side to the optical axis and positions radially inward toward the optical axis from these positions.

In addition, the inflection point on the surface of the sixth lens L6 toward the image side may be provided positions at the intersection of a principal light ray at a maximum angle of view and the surface of the sixth lens L6 toward the image side to the optical axis and at any desired position radially inward toward the optical axis from these positions.

In addition, in the case that each of the first lens L1 through the sixth lens L6that constitute the imaging lens L is a single lens, the number of lens surfaces will be greater than that for a case in which any of the first lens L1 through the sixth lens L6 is a cemented lens. Therefore, the degree of freedom in the design of each lens will increase. As a result, shortening of the total length and increase in resolution will be facilitated.

According to the imaging lens L described above, the configurations of each of the first lens L1 through the sixth lens L6 are optimized as lens elements in a lens configuration having a total of six lenses. Therefore, a lens system that achieves a shortened total length, a widened angle of view, and a small F number and has high imaging performance from a central angle of view to peripheral angles of view, can be realized.

It is preferable for at least one of the surfaces of each of the first lens L1through the sixth lens L6 of the imaging lens L to be an aspherical surface, in order to improve performance.

Next, the operation and effects of conditional formulae related to the imaging lens L will be described in greater detail. Note that it is preferable for the imaging lens L to satisfy any one of the following conditional formulae, or arbitrary combinations of the following conditional formulae. It is preferable for the conditional formulae to be satisfied to be selected as appropriate according to the items required of the imaging lens L.

First, it is preferable for the focal length f3 of the third lens L3 and the focal length f of the entire system to satisfy Conditional Formula (1) below.

$$-0.25 < f/f3 < 1 \quad (1)$$

Conditional Formula (1) defines a preferable range of numerical values for the ratio of the focal length f of the entire system with respect to the focal length f3 of the third lens L3. It is preferable for the refractive power of the third lens L3 to be suppressed such that the value of f/f3 is not less than or equal to the lower limit defined in Conditional Formula (1). In this case, the refractive power of the third lens L3 will not become excessively strong with respect to the refractive power of the entire system if the third lens L3 has a negative refractive power. Such a configuration is advantageous from the viewpoint of shortening the total length of the lens. In addition, by suppressing the refractive power of the third lens L3 such that the value of f/f3 is not greater than or equal to the upper limit defined in Conditional Formula (1), the refractive power of the third lens L3 will not become excessively strong with respect to the refractive power of the entire system if the third lens L3 has a positive refractive power. As a result, spherical aberration being insufficiently corrected can be favorably prevented. It is more preferable for Conditional Formula (1-1) to be satisfied, and even more preferable for Conditional Formula (1-2) to be satisfied, in order to cause these advantageous effects to become more prominent.

$$-0.24 < f/f3 < 0.8 \qquad (1-1)$$

$$-0.23 < f/f6 < 0.46 \qquad (1-2)$$

In addition, it is preferable for the focal length f5 of the fifth lens L5 and the focal length f of the entire system to satisfy Conditional Formula (2) below.

$$-3.5 < f/f5 < 0 \qquad (2)$$

Conditional Formula (2) defines a preferable range of numerical values for the ratio of the focal length f of the entire system with respect to the focal length f5 of the fifth lens L5. By suppressing the refractive power of the fifth lens L5 such that the value of f/f5 is not less than or equal to the lower limit defined in Conditional Formula (2), the negative refractive power of the fifth lens L5 will not become excessively strong with respect to the refractive power of the entire system. As a result, distortion can be favorably corrected. By securing the refractive power of the fifth lens L5 such that the value of f/f5 is not greater than or equal to the upper limit defined in Conditional Formula (2), the negative refractive power of the fifth lens L5 will not become excessively weak with respect to the refractive power of the entire system. This configuration is favorable from the viewpoint of the advantageous effect related to the shortening of the total length of the lens being exhibited by the imaging lens L being arranged as a telephoto type configuration if the first lens L1 through the fourth lens L4 is considered to be a positive first lens group and the fifth lens L5 and the sixth lens L6 is considered to be a negative second lens group. It is more preferable for Conditional Formula (2-1) to be satisfied, and even more preferable for Conditional Formula (2-2) to be satisfied, in order to cause these advantageous effects to become more prominent.

$$-2.5 < f/f5 < 0 \qquad (2-1)$$

$$-1.7 < f/f5 < -0.19 \qquad (2-2)$$

In addition, it is preferable for the focal length f4 of the fourth lens L4 and the focal length f5 of the fifth lens L5 to satisfy Conditional Formula (3) below.

$$-4 < f4/f5 < 0 \qquad (3)$$

Conditional Formula (3) defines a preferable range of numerical values for the ratio of the focal length f4 of the fourth lens L4 with respect to the focal length f5 of the fifth lens L5. By securing the positive refractive power of the fourth lens L4 with respect to the fifth lens L5 such that the value of f4/f5 is not less than or equal to the lower limit defined in Conditional Formula (3), the positive refractive power of the fourth lens L4 will not become excessively weak with respect to the negative refractive power of the fifth lens L5. As a result, spherical aberration can be favorably corrected. By suppressing the refractive power of the fourth lens L4 with respect to the refractive power of the fifth lens L5 such that the value of f4/f5 is not greater than or equal to the upper limit defined in Conditional Formula (3), positive refractive power of the fourth lens L4 will not become excessively strong with respect to the negative refractive power of the fifth lens L5. As a result, a shortening of the total length of the lens can be favorably realized. It is more preferable for Conditional Formula (3-1) to be satisfied, and even more preferable for Conditional Formula (3-2) to be satisfied, in order to cause these advantageous effects to become more prominent.

$$-2 < f4/f5 < 0 \qquad (3-1)$$

$$-0.9 < f4/f5 < -0.1 \qquad (3-2)$$

In addition, it is preferable for the focal length f2 of the second lens L2 and the focal length f of the entire system to satisfy Conditional Formula (4) below.

$$-2 < f/f2 < 0 \qquad (4)$$

Conditional Formula (4) defines a preferable range of numerical values for the ratio of the focal length f of the entire system with respect to the focal length f2 of the second lens L2. By suppressing the refractive power of the second lens L2 such that the value of f/f2 is not less than or equal to the lower limit defined in Conditional Formula (4), the negative refractive power of the second lens L2 will not become excessively strong with respect to the refractive power of the entire system. Such a configuration is advantageous from the viewpoint of realizing a small F number while preventing spherical aberration from being excessively corrected. By securing the refractive power of the second lens L2 such that the value of f/f2 is not greater than or equal to the upper limit defined in Conditional Formula (4), the negative refractive power of the second lens L2 will not become excessively weak with respect to the refractive power of the entire system. As a result, longitudinal chromatic aberration can be favorably corrected. It is more preferable for the Conditional Formula (4-1) to be satisfied, and even more preferable for Conditional Formula (4-2) to be satisfied, in order to cause these advantageous effects to become more prominent.

$$-1 < f/f2 < -0.3 \qquad (4-1)$$

$$-0.8 < f/f2 < -0.4 \qquad (4-2)$$

In addition, it is preferable for the focal length f4 of the fourth lens L4 and the focal length f of the entire system to satisfy Conditional Formula (5) below.

$$0 < f/f4 < 3 \qquad (5)$$

Conditional Formula (5) defines a preferable range of numerical values for the ratio of the focal length f4 of the fourth lens L4 with respect to the focal length f of the entire system. By securing the refractive power of the fourth lens L4 such that the value of f/f4 is not less than or equal to the lower limit defined in Conditional Formula (4), the positive refractive power of the fourth lens L4 will not become excessively weak with respect to the refractive power of the entire system. As a result, a shortening of the total length of the lens can be favorably realized. By suppressing the refractive power of the fourth lens L4 such that the value of f/f4 is not greater than or equal to the upper limit defined in Conditional Formula (5), the positive refractive power of the fourth lens L4 will not become excessively strong with respect to the refractive power of the entire system. As a result, lateral chromatic aberration can be favorably corrected. It is more preferable for Conditional Formula (5-1) to be satisfied, and even more preferable for Conditional Formula (5-2) to be satisfied, in order to cause these advantageous effects to become more prominent.

$$0.8 < f/f4 < 2.5 \tag{5-1}$$

$$1.2 < f/f4 < 1.95 \tag{5-2}$$

In addition, it is preferable for the focal length f1 of the first lens L1 and the focal length f of the entire system to satisfy Conditional Formula (6) below.

$$0.7 < f/f1 < 2 \tag{6}$$

Conditional Formula (6) defines a preferable range of numerical values for the ratio of the focal length f of the entire system with respect to the focal length f1 of the first lens L1. By securing the refractive power of the first lens L1 such that the value of f/f1 is not less than or equal to the lower limit defined in Conditional Formula (6), the positive refractive power of the first lens L1 will not become excessively weak with respect to the refractive power of the entire system. As a result, a shortening of the total length of the lens can be favorably realized. By suppressing the refractive power of the first lens L1 such that the value of f/f1 is not greater than or equal to the upper limit defined in Conditional Formula (6), the positive refractive power of the first lens L1 will not become excessively strong with respect to the refractive power of the entire system. As a result, spherical aberration can be favorably corrected, and such a configuration is advantageous from the viewpoint of realizing a small F number. In addition, by configuring the imaging lens L such that the value of f/f1 is not greater than or equal to the upper limit defined in Conditional Formula (6), astigmatism can be favorably corrected, and is advantageous from the viewpoint of realizing a wider angle of view. It is more preferable for Conditional Formula (6-1) to be satisfied, and even more preferable for Conditional Formula (6-2) to be satisfied, in order to cause these advantageous effects to become more prominent.

$$0.81 < f/f1 < 1.5 \tag{6-1}$$

$$0.9 < f/f1 < 1.3 \tag{6-2}$$

In addition, it is preferable for the focal length f of the entire system and the refractive power P34 of an air lens formed between the surface of the third lens L3 toward the image side and the surface of the fourth lens L4 toward the object side to satisfy Conditional Formula (7) below.

$$-3 < f \cdot P34 < 0 \tag{7}$$

Here, P34 is obtained by Formula (P) below:

$$P34 = \frac{1 - Nd3}{L3r} + \frac{Nd4 - 1}{L4f} - \frac{(1 - Nd3) \times (Nd4 - 1) \times D7}{L3r \times L4f} \tag{P}$$

wherein Nd3 is the refractive index of the third lens L3 with respect to the d line, Nd4 is the refractive index of the fourth lens L4 with respect to the d line, L3r is the paraxial radius of curvature of the surface of the third lens L3 toward the image side, L4f is the paraxial radius of curvature of the surface of the fourth lens L4 toward the object side, and D7 is an air space distance between the third lens and the fourth lens along the optical axis.

Refractive power is an inverse of focal length. Therefore, if the focal length of the air lens formed between the surface of the third lens L3 toward the image side and the surface of the fourth lens L4 toward the object side is designated as f34a, Conditional Formula (7) defines a preferable range of numerical values for the ratio of the focal length f of the entire system with respect to the focal length f34a. By configuring the imaging lens such that the value of f·P34 is not less than or equal to the lower limit defined in Conditional Formula (7), the refractive power of the air lens formed between the surface of the third lens L3 toward the image side and the surface of the fourth lens L4 toward the object side will not be excessively strong. As a result, distortion can be favorably corrected. By configuring the imaging lens such that the value of f·P34 is not greater than or equal to the upper limit defined in Conditional Formula (7), the refractive power of the air lens formed between the surface of the third lens L3 toward the image side and the surface of the fourth lens L4 toward the object side will not be excessively weak. As a result, astigmatism can be favorably corrected. It is more preferable for Conditional Formula (7-1) to be satisfied, and even more preferable for Conditional Formula (7-2) to be satisfied, in order to cause these advantageous effects to become more prominent.

$$-1.5 < f \cdot P34 < -0.2 \tag{7-1}$$

$$-1 < f \cdot P34 < -0.2 \tag{7-2}$$

In addition, it is preferable for the paraxial radius of curvature L4f of the surface of the fourth lens L4 toward the object side and the paraxial radius of curvature L4r of the surface of the fourth lens L4 toward the image side to satisfy Conditional Formula (8) below.

$$-10 < (L4r + L4f)/(L4r - L4f) < 4 \tag{8}$$

Conditional Formula (8) defines a preferable range of numerical values related to the paraxial radius of curvature L4f of the surface of the fourth lens L4 toward the object side and the paraxial radius of curvature L4r of the surface of the fourth lens L4 toward the image side. By configuring the imaging lens such that the value of (L4r+L4f)/(L4r-L4f) is not less than or equal to the lower limit defined in Conditional Formula (8), the absolute value of the paraxial radius of curvature of the surface of the fourth lens L4 toward the image side will be prevented from becoming excessively small. As a result, spherical aberration can be favorably corrected. By configuring the imaging lens such that the value of (L4r+L4f)/(L4r-L4f) is not greater than or equal to the upper limit defined in Conditional Formula (8), the absolute value of the paraxial radius of curvature of the surface of the fourth lens L4 toward the object side will be prevented from becoming excessively small. As a result, astigmatism can be favorably corrected. It is more preferable for Conditional Formula (8-1) to be satisfied, and even more preferable for Conditional Formula (8-2) to be satisfied, in order to cause these advantageous effects to become more prominent.

$$-5 < (L4r + L4f)/(L4r - L4f) < 0 \tag{8-1}$$

$$-2.5 < (L4r + L4f)/(L4r - L40 < -1.5 \tag{8-2}$$

As described above, in the imaging lens L according to the embodiments of the present invention, the configurations of each lens element is optimized in a lens configuration having a total of six lenses. Therefore, a lens system that favorably corrects astigmatism, achieves a shortened total length with respect to an image size, a widened angle of view, and a small F number, which is compatible with imaging elements that satisfy demand for a greater number of pixels and has high imaging performance from a central angle of view to peripheral angles of view, can be realized.

In addition, the imaging lenses L of the embodiments of the present invention can realize a maximum angle of view in a state focused on an object at infinity of 79 degrees or greater as shown in each of the Examples. Therefore, the imaging lens L may be favorably applied for use in imaging apparatuses such as cellular telephones, smart phones, and tablet terminals. In addition, the imaging lenses L of the embodiments of the present invention are capable of having F numbers of less than 2.1, for example, as shown in each of the Examples. For this reason as well, the imaging lens may be favorably applied for use in imaging apparatuses equipped with imaging elements that satisfy demand for an increased number of pixels, such as cellular telephones, smart phones, and tablet terminals. In contrast, the imaging lenses disclosed in Japanese Unexamined Patent Publication No. 2013-182090 and Taiwanese Patent Publication No. 201331617 do not satisfy requirements for a small F number, a wide angle of view, and a short total length. Therefore, it is difficult for these imaging lenses to be compatible with imaging elements capable of meeting demand for an increased number of pixels.

Further improved imaging performance can be realized by satisfying the above preferred conditions as appropriate. In addition, the imaging apparatuses according to the embodiments of the present invention output image signals corresponding to optical images formed by the high performance imaging lenses according to the embodiments of the present invention. Therefore, photographed images having high resolution from a central angle of view to peripheral angles of view can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first, are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1st surface Si+1 from the object side along the optical axis Z are shown in the column Di. The refractive indices of jth optical elements from the object side with respect to the d line (wavelength: 587.6 nm) are shown in the column Ndj. The Abbe's numbers of the jth optical elements with respect to the d line are shown in the column vdj.

Table 1 also shows the aperture stop St and the optical member CG In Table 1 "(St)" is indicated along with a surface number in the row of the surface number of the surface that corresponds to the aperture stop St, and "(IMG)" is indicated along with a surface number in the row of the surface number of the surface that corresponds to the imaging surface. The signs of the radii of curvature are positive for surface shapes having convex surfaces toward the object side, and negative for surface shapes having convex surfaces toward the image side. Note that the values of the focal length f (mm) of the entire system, the back focus Bf (mm), the F number Fno. and the maximum angle of view 2ω(°) in a state focused on an object at infinity are shown as data above the lens data. Note that the back focus Bf is represented as an air converted value. In the imaging lens of Example 1, both of the surfaces of the first lens L1 through the sixth lens L6 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "1.0·10⁻²".

The values of coefficients An and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = \frac{C \times h^2}{1 + \sqrt{1 - KA \times C^2 \times h^2}} + \sum_n An \times h^n \tag{A}$$

wherein: Z is the depth of the aspherical surface (mm), h is the distance from the optical axis to the surface of the lens (height) (mm), C is the paraxial curvature=1/R (R is the paraxial radius of curvature), An is an nth ordinal aspherical surface coefficient (n is an integer 3 or greater), and KA is an aspherical surface coefficient.

Specific lens data corresponding to the configurations of the imaging lenses illustrated in FIG. 2 through FIG. 5 are shown in Table 3 through Table 10 as Example 2 through Example 5. In the imaging lenses of Examples 1 through 5, both of the surfaces of the first lens L1 through the sixth lens L6 are all aspherical surfaces.

Figure 7:
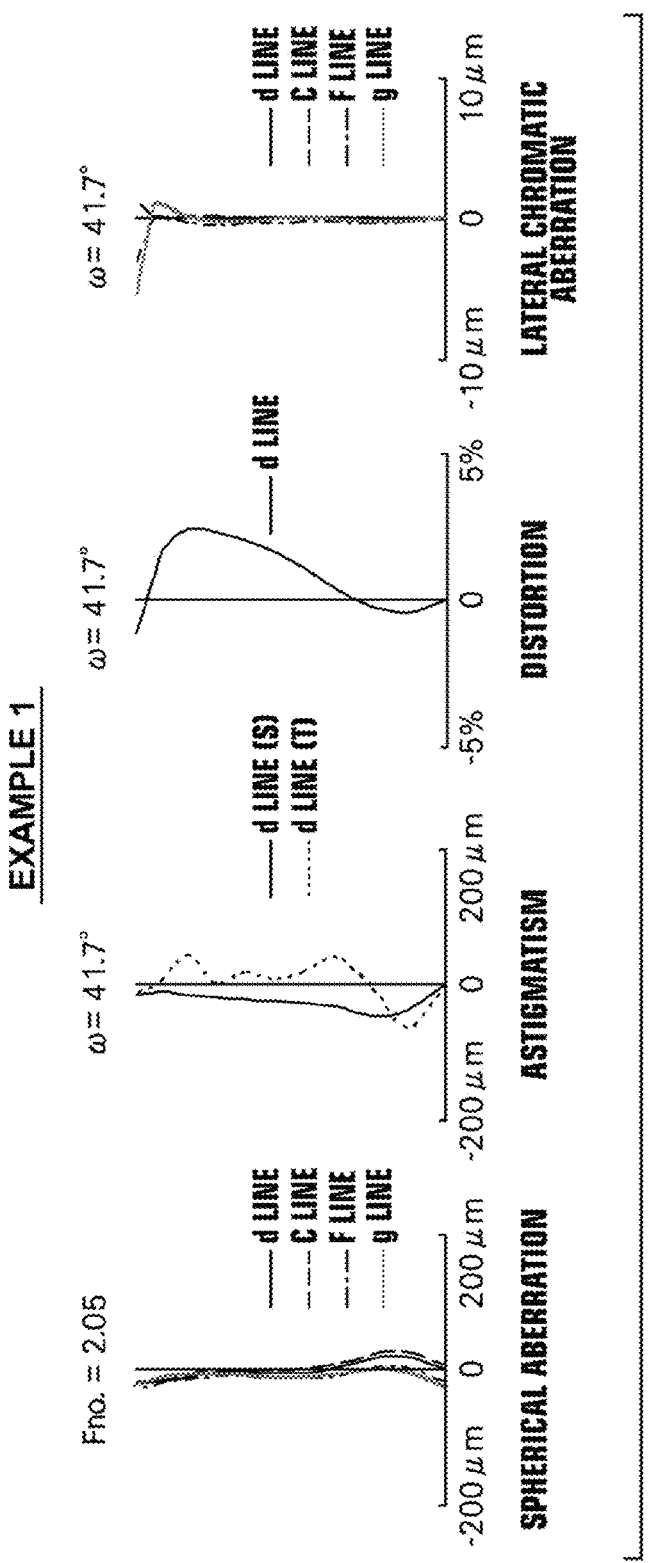
FIG. 7 is a collection of diagrams that illustrate aberrations of the imaging lens of Example 1, wherein the diagrams illustrate spherical aberration, astigmatism, distortion, and lateral chromatic aberration, in this order from the left side of the drawing sheet.
Figure 8:
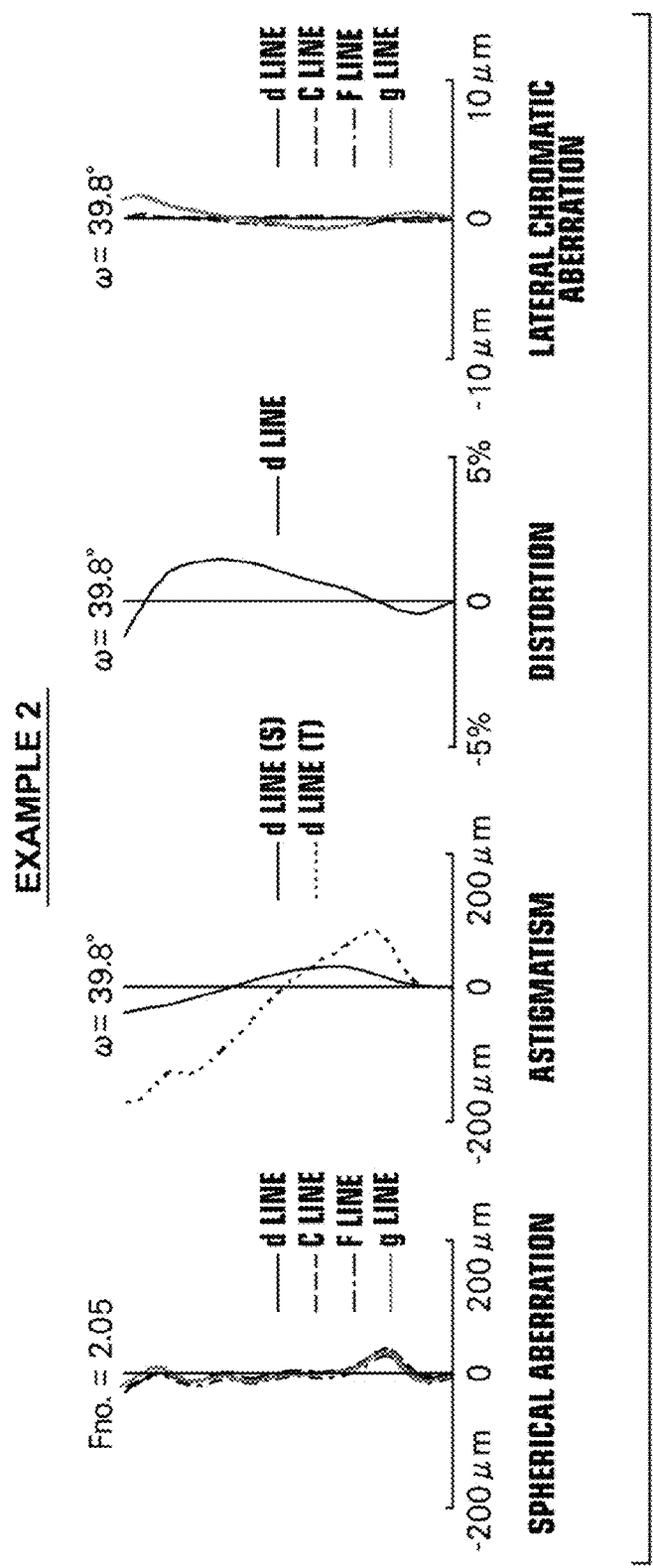
FIG. 8 is a collection of diagrams that illustrate aberrations of the imaging lens of Example 2, wherein the diagrams illustrate spherical aberration, astigmatism, distortion, and lateral chromatic aberration, in this order from the left side of the drawing sheet.
Figure 9:
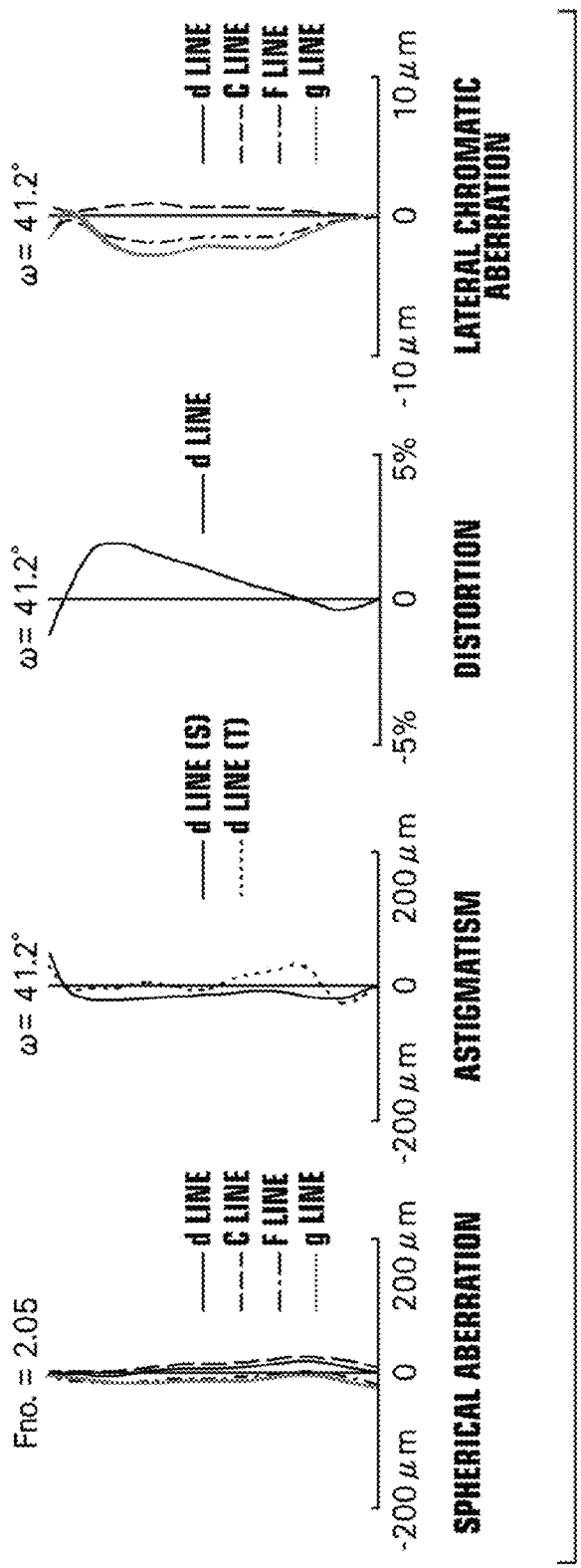
FIG. 9 is a collection of diagrams that illustrate aberrations of the imaging lens of Example 3, wherein the diagrams illustrate spherical aberration, astigmatism, distortion, and lateral chromatic aberration, in this order from the left side of the drawing sheet.
Figure 10:
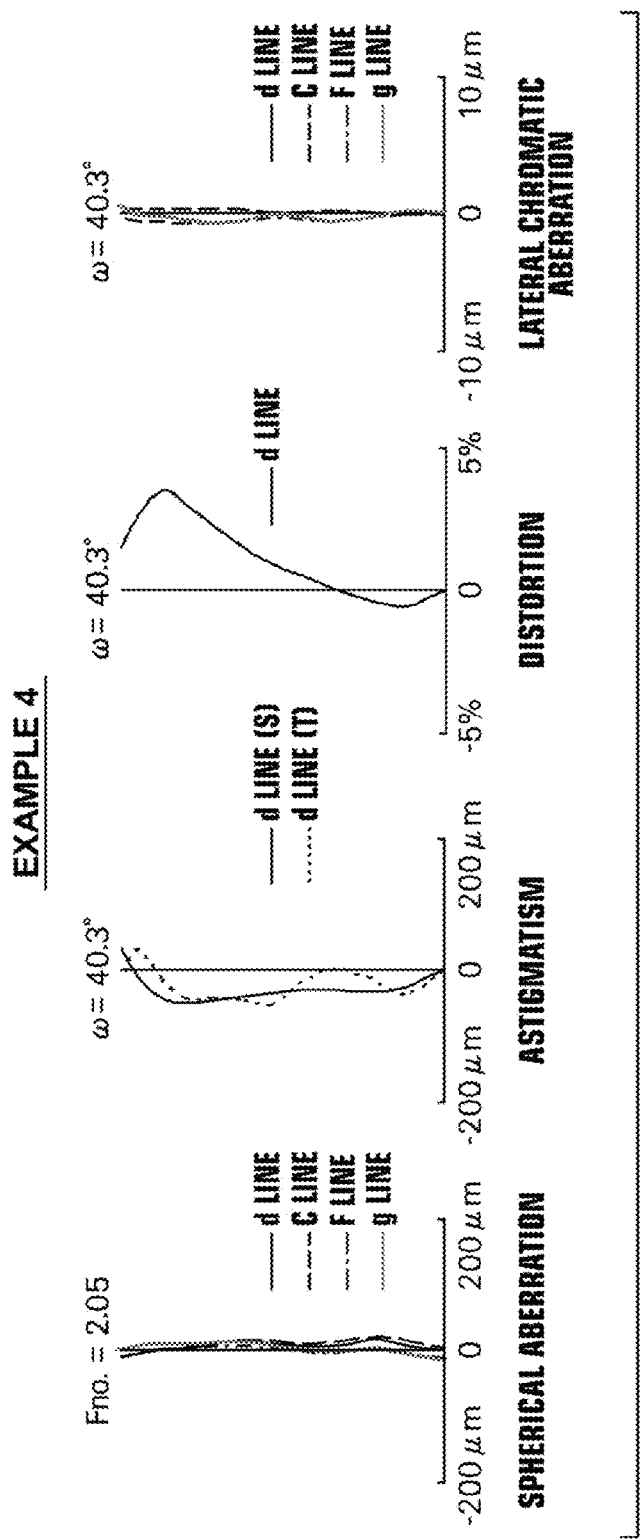
FIG. 10 is a collection of diagrams that illustrate aberrations of the imaging lens of Example 4, wherein the diagrams illustrate spherical aberration, astigmatism, distortion, and lateral chromatic aberration, in this order from the left side of the drawing sheet.
Figure 11:
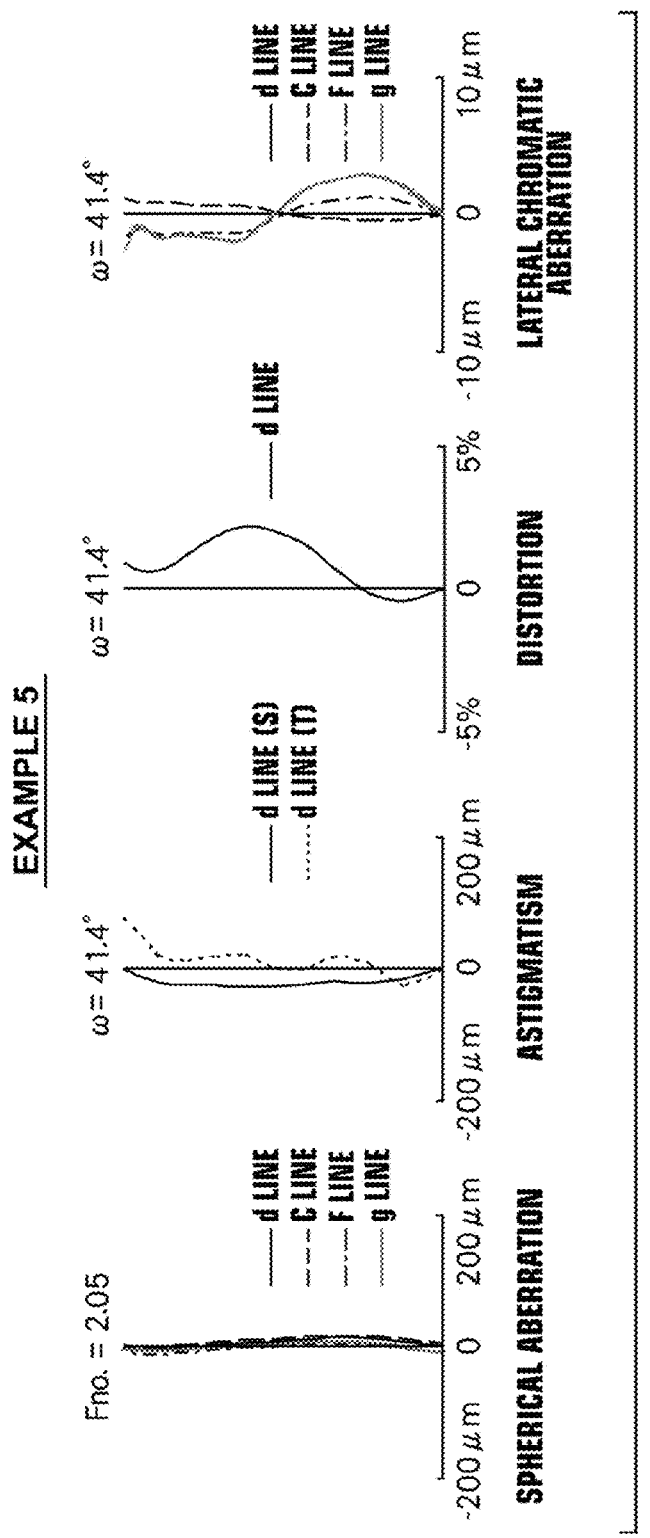
FIG. 11 is a collection of diagrams that illustrate aberrations of the imaging lens of Example 5, wherein the diagrams illustrate spherical aberration, astigmatism, distortion, and lateral chromatic aberration, in this order from the left side of the drawing sheet.

FIG. 7 is a collection of diagrams that illustrate aberrations of the imaging lens of Example 1, wherein the diagrams illustrate the spherical aberration, the astigmatism, the distortion, and the lateral chromatic aberration (chromatic aberration of magnification) of the imaging lens of Example 1, respectively, in this order from the left side of the drawing sheet. Each of the diagrams that illustrate the spherical aberration, the astigmatism (field curvature), and the distortion illustrate aberrations using the d line (wavelength: 587.6 nm) as a reference wavelength. The diagram that illustrates spherical aberration also shows aberrations related to the F line (wavelength: 486.1 nm), the C line (wavelength: 656.3 nm) and the g line (wavelength: 435.8 nm). The diagram that illustrates lateral chromatic aberration shows aberrations related to the F line, the C line, and the g line. In the diagram that illustrates astigmatism, aberration in the sagittal direction (S) is indicated by a solid line, while aberration in the tangential direction (T) is indicated by a broken line. In addition, "Fno." denotes F numbers, and "ω" denotes a half value of the maximum angle of view in a state focused on an object at infinity.

Similarly, the aberrations of the imaging lens of Example 2 through Example 5 are illustrated in FIG. 8 through FIG. 11. The diagrams that illustrate aberrations of FIG. 8 through FIG. 11 are all for cases in which the object distance is infinity.

Table 11 shows values corresponding to Conditional Formulae (1) through (8) respectively summarized for each of Examples 1 through 5.

As can be understood from each set of numerical value data and from the diagrams that illustrate aberrations, each of the Examples realize a shortening of the total length of the lens, a widened angle of view, and high imaging performance.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 4.560, Bf = 1.159, Fno. = 2.05, 2ω = 83.4

| Si | Ri | Di | Ndj | vdj |
|---|---|---|---|---|
| 1 (St) | ∞ | −0.110 | | |
| *2 | 1.92713 | 0.764 | 1.54488 | 54.87 |
| *3 | 40.48189 | 0.047 | | |
| *4 | −87.49933 | 0.243 | 1.63350 | 23.62 |
| *5 | 5.59440 | 0.512 | | |
| *6 | 9.53397 | 0.351 | 1.54488 | 54.87 |
| *7 | 9.36590 | 0.449 | | |
| *8 | −3.70504 | 0.577 | 1.54488 | 54.87 |
| *9 | −1.31609 | 0.058 | | |
| *10 | −14.13888 | 0.278 | 1.63350 | 23.62 |
| *11 | 1492.38940 | 0.450 | | |
| *12 | −57.17044 | 0.541 | 1.54488 | 54.87 |
| *13 | 1.90540 | 0.500 | | |
| 14 | ∞ | 0.210 | 1.51633 | 64.14 |
| 15 | ∞ | 0.521 | | |
| 16 (IMG) | ∞ | | | |

*aspherical surface

TABLE 2

Example 1: Aspherical Surface Data

| Surface No. | KA | A3 | A4 | A5 | A6 |
|---|---|---|---|---|---|
| 2 | 1.7492930E+00 | 4.7239939E−04 | −5.0477856E−02 | 4.0195641E−01 | −1.7526097E+00 |
| 3 | −4.4523794E+00 | −3.4212107E−04 | −5.7036910E−02 | −4.0895326E−01 | 1.1688327E+00 |
| 4 | −2.8374778E+02 | −2.2979015E−04 | −1.8968142E−01 | 2.6893509E−01 | 1.0635439E−01 |
| 5 | −1.5902850E+01 | 5.6924126E−04 | 7.7024940E−03 | 8.8999271E−02 | −6.8884580E−01 |
| 6 | 5.2715269E+01 | −4.6768271E−04 | −2.1463014E−01 | 1.8450005E−01 | 4.7598631E−01 |
| 7 | 1.8174546E+01 | −3.7542070E−03 | −2.3163397E−01 | 2.5639195E−01 | 9.7530720E−01 |
| 8 | −1.6430053E+02 | 2.6589222E−04 | −3.9956924E−01 | 4.5386895E−01 | 7.4479792E−02 |
| 9 | −1.6789934E−01 | 1.6958495E−03 | −4.5302393E−03 | 4.6528340E−01 | −1.2186603E+00 |
| 10 | −3.2013726E+00 | 2.3990527E−04 | 1.5187696E−01 | −4.3959912E−01 | −1.5381301E−01 |
| 11 | −5.6426851E+00 | −1.3458281E−03 | 1.7727411E−01 | −1.6910970E−01 | 8.1971819E−02 |
| 12 | −2.5647410E+01 | 1.0086744E−03 | −4.6655675E−03 | −3.0947351E−02 | −2.7484412E−02 |
| 13 | −3.4503748E+00 | −5.9826509E−04 | −7.5619573E−02 | −6.8282006E−03 | 5.8917840E−02 |

| | A7 | A8 | A9 | A10 | A11 |
|---|---|---|---|---|---|
| 2 | 3.0897820E+00 | −4.3512463E−01 | −6.8985872E+00 | 1.0326883E+01 | −3.3681475E+00 |
| 3 | −1.8296540E+00 | 3.7094037E+00 | −5.8326338E+00 | 2.8432496E+00 | 5.4945802E+00 |
| 4 | −8.6997603E−01 | 1.6553187E+00 | −3.3627739E−01 | −1.9509580E+00 | 7.6928877E−01 |
| 5 | 2.5254145E+00 | −3.4654231E+00 | 1.6618753E+00 | −3.2639782E−01 | 1.3013776E+00 |
| 6 | −2.4665126E+00 | 4.0401262E+00 | −3.2911511E+00 | 1.3782168E+00 | 5.6196895E−02 |
| 7 | −4.2318166E+00 | 5.1605235E+00 | 1.3580511E+00 | −9.9995548E+00 | 9.8227154E+00 |
| 8 | −1.8363353E−01 | −9.1161690E−02 | 1.6211421E−01 | −1.1387679E−01 | 6.5723671E−02 |
| 9 | 1.3876769E+00 | −4.5335067E−01 | −3.3601280E−01 | 3.0232841E−01 | −9.5197067E−02 |
| 10 | 8.7721781E−02 | 1.4048874E−02 | −6.9795459E−03 | −1.0115771E−02 | 1.4347930E−03 |
| 11 | −2.2383785E−01 | 2.8112657E−01 | −1.3753002E−01 | 1.9510746E−02 | 4.2935655E−03 |
| 12 | 3.0280798E−02 | −7.6701826E−03 | 4.4898476E−03 | −2.6392836E−03 | 4.7289030E−04 |
| 13 | −4.7175874E−02 | 2.8986857E−02 | −1.7778754E−02 | 7.7402418E−03 | −1.6184890E−03 |

| | A12 | A13 | A14 | A15 | A16 |
|---|---|---|---|---|---|
| 2 | −6.2911773E+00 | 8.1917022E+00 | −3.9318441E+00 | 6.3467593E−01 | 4.4920855E−02 |
| 3 | −1.0560059E+01 | 6.4795680E+00 | 3.5626824E−01 | −2.0883865E+00 | 6.6013468E−01 |
| 4 | 1.0806808E+00 | 5.7535032E−02 | −9.1937098E−01 | 3.0421410E−01 | 2.2418392E−02 |
| 5 | −1.3326236E+00 | 3.9607627E−01 | −8.2167110E−01 | 1.1290012E+00 | −4.0855412E−01 |
| 6 | −1.4765890E+00 | 2.2328023E+00 | −1.2301633E+00 | 1.1257474E−02 | 1.4446027E−01 |
| 7 | −1.9207623E+00 | −3.5008350E+00 | 3.2099383E+00 | −1.2047545E+00 | 1.8906192E−01 |
| 8 | −3.3188522E−02 | 2.7364482E−02 | −1.5989663E−02 | 3.0770337E−03 | 7.1491033E−05 |
| 9 | 2.8142439E−02 | 1.0229333E−02 | −2.4406644E−02 | 1.1211001E−02 | −1.6295320E−03 |
| 10 | 1.5491005E−03 | 5.9847434E−04 | −6.4553096E−04 | 1.3433760E−04 | −7.2535523E−06 |
| 11 | −2.1910730E−03 | 9.3447857E−04 | −6.3732380E−04 | −1.2356987E−04 | 2.7074879E−05 |
| 12 | −1.6031102E−04 | 1.2531527E−04 | −3.0698036E−05 | 1.2456882E−06 | 2.2188462E−07 |
| 13 | −6.8752271E−05 | 1.1368953E−04 | −2.5927012E−05 | 2.9147880E−06 | −1.5277889E−07 |

TABLE 3

Example 2
f = 5.024, Bf = 1.126, Fno. = 2.05, 2ω = 79.6

| Si | Ri | Di | Ndj | νdj |
|---|---|---|---|---|
| 1 (St) | ∞ | −0.123 | | |
| *2 | 2.18163 | 0.882 | 1.54488 | 54.87 |
| *3 | 51.05612 | 0.071 | | |
| *4 | −40.71619 | 0.300 | 1.63350 | 23.62 |
| *5 | 5.40127 | 0.396 | | |
| *6 | 7.38908 | 0.475 | 1.54488 | 54.87 |
| *7 | 23.34130 | 0.673 | | |
| *8 | −4.29470 | 0.563 | 1.54488 | 54.87 |
| *9 | −1.44968 | 0.058 | | |
| *10 | −22.13394 | 0.371 | 1.63350 | 23.62 |
| *11 | 9.88953 | 0.427 | | |
| *12 | −25.45971 | 0.728 | 1.54488 | 54.87 |
| *13 | 2.38766 | 0.559 | | |
| 14 | ∞ | 0.210 | 1.51633 | 64.14 |
| 15 | ∞ | 0.429 | | |
| 16 (IMG) | ∞ | | | |

*aspherical surface

TABLE 5

Example 3
f = 4.818, Bf = 1.050, Fno. = 2.05, 2ω = 82.4

| Si | Ri | Di | Ndj | νdj |
|---|---|---|---|---|
| 1 (St) | ∞ | −0.127 | | |
| *2 | 2.47253 | 1.020 | 1.54488 | 54.87 |
| *3 | 19.45475 | 0.167 | | |
| *4 | 172.31331 | 0.235 | 1.63350 | 23.62 |
| *5 | 5.44063 | 0.309 | | |
| *6 | 7.51054 | 0.589 | 1.54488 | 54.87 |
| *7 | −24.79021 | 0.791 | | |
| *8 | −4.38383 | 0.528 | 1.54488 | 54.87 |
| *9 | −1.50860 | 0.043 | | |
| *10 | 56.30255 | 0.449 | 1.63350 | 23.62 |
| *11 | 8.63204 | 0.419 | | |
| *12 | −33.87098 | 0.542 | 1.54488 | 54.87 |
| *13 | 2.03878 | 0.582 | | |
| 14 | ∞ | 0.214 | 1.51633 | 64.14 |
| 15 | ∞ | 0.327 | | |
| 16 (IMG) | ∞ | | | |

*aspherical surface

TABLE 4

Example 2: Aspherical Surface Data

| Surface No. | KA | A3 | A4 | A5 | A6 |
|---|---|---|---|---|---|
| 2 | 1.7492930E+00 | −1.0386934E−01 | 2.0120034E+00 | −1.5571106E+01 | 6.0910329E+01 |
| 3 | −4.4523794E+00 | −2.2130549E−04 | −1.2316753E−02 | −1.4084319E−01 | 1.1593832E−01 |
| 4 | −3.3532739E+02 | 1.2732964E−04 | −7.7174015E−02 | 1.1090617E−01 | −3.1121812E−02 |
| 5 | −1.9202039E+01 | −9.3275686E−05 | −1.2886367E−02 | 6.1064582E−02 | −8.5955527E−02 |
| 6 | 1.4884788E+01 | −6.0348400E−04 | −1.3259379E−01 | 1.8371847E−01 | 1.8551005E−01 |
| 7 | 1.8174546E+01 | −1.0389996E−03 | −1.3748526E−01 | 2.7757330E−01 | 2.2790425E−01 |
| 8 | −1.6430053E+02 | −7.9172184E−03 | −3.1423960E−01 | 1.3698211E−01 | 1.4308843E+00 |
| 9 | −1.6789934E−01 | −3.2905634E−03 | 1.8919423E−01 | 6.9777054E−02 | −2.9991812E−01 |
| 10 | −3.2013726E+00 | 1.0738851E−04 | 3.2391818E−01 | −2.3986868E−01 | −1.1047636E−01 |
| 11 | −5.6426851E+00 | 1.8079474E−03 | 1.0818061E−01 | 7.2937313E−03 | −1.9036334E−01 |
| 12 | −2.5647410E+01 | −2.1460070E−03 | 8.4603861E−02 | −2.1311305E−01 | 1.4591998E−01 |
| 13 | −3.4503748E+00 | −9.0635983E−04 | −2.6605586E−03 | −9.1885389E−02 | 7.0391885E−02 |

| | A7 | A8 | A9 | A10 | A11 |
|---|---|---|---|---|---|
| 2 | −1.2487132E+02 | 9.8358616E+01 | 1.0452238E+02 | −2.9141641E+02 | 1.5326637E+02 |
| 3 | 3.7528005E−01 | −5.0853291E−01 | −2.4224539E−01 | 6.3695359E−01 | 8.1217299E−02 |
| 4 | −1.4078575E−01 | 4.3273511E−01 | −2.5026150E−01 | −2.2187013E−01 | 5.8235586E−03 |
| 5 | 1.6188303E−01 | 1.0057438E−01 | −4.5805641E−01 | 1.7059439E−01 | 2.2224861E−01 |
| 6 | −1.6835399E+00 | 3.0402358E+00 | −1.9627030E+00 | −6.4892161E−01 | 1.5205889E+00 |
| 7 | −2.3964156E+00 | 4.9673871E+00 | −5.0990171E+00 | 2.5458818E+00 | −7.6352798E−02 |
| 8 | −3.1050338E+00 | 2.9475432E+00 | −1.3456211E+00 | 8.0701527E−02 | 1.9312314E−01 |
| 9 | 3.9804400E−03 | 2.9240471E−01 | −1.4062673E−01 | −8.4447162E−02 | 7.7552310E−02 |
| 10 | 1.1329792E−01 | −2.6026529E−04 | −6.2902137E−03 | −4.5782437E−03 | −1.6731343E−03 |
| 11 | 1.2041494E−01 | −2.8404435E−02 | 1.0345774E−02 | 1.2526661E−03 | −6.1838948E−03 |
| 12 | −8.8406322E−02 | 6.8630722E−02 | −2.6764773E−02 | −2.1425935E−03 | 4.5028733E−03 |
| 13 | −1.3489590E−02 | 1.0240234E−03 | −2.5796000E−03 | 6.9806285E−04 | 2.7703730E−04 |

| | A12 | A13 | A14 | A15 | A16 |
|---|---|---|---|---|---|
| 2 | 2.1394814E+02 | −3.9365644E+02 | 2.7188324E+02 | −9.1935386E+01 | 1.2633563E+01 |
| 3 | −7.2334815E−01 | 2.3541953E−01 | 4.6111643E−01 | −4.0966083E−01 | 9.8497038E−02 |
| 4 | 2.5477405E−01 | 1.0655649E−02 | −1.3260154E−01 | 2.9285481E−02 | 6.1335357E−03 |
| 5 | 4.8254362E−02 | −3.2280396E−01 | 1.1855631E−01 | 6.2823798E−02 | −3.2600961E−02 |
| 6 | −4.5445833E−01 | −4.0105911E−01 | 4.5611804E−01 | −2.4749296E−01 | 6.4341021E−02 |
| 7 | −7.4070617E−01 | 5.7737113E−01 | −2.6300755E−01 | 6.7660205E−02 | −6.0627081E−03 |
| 8 | −2.2325254E−02 | −8.3258165E−02 | 6.1511741E−02 | −1.8910386E−02 | 2.2539253E−03 |
| 9 | 8.8703847E−03 | −2.8789469E−02 | 1.2031619E−02 | −2.0115103E−03 | 1.1016809E−04 |
| 10 | 2.3329203E−03 | −1.1480866E−04 | −2.5235241E−04 | 6.4605941E−05 | −5.1981616E−06 |
| 11 | 1.0255563E−03 | 1.3919624E−03 | −6.5436171E−04 | 9.7449319E−05 | −3.8317834E−06 |
| 12 | −5.4576130E−04 | −5.1589094E−04 | 2.2914105E−04 | −3.8445070E−05 | 2.4409519E−06 |
| 13 | −7.2266622E−05 | −3.4284397E−05 | 1.4276906E−05 | −1.6783221E−06 | 5.2021243E−08 |

TABLE 6

Example 3: Aspherical Surface Data

| Surface No. | KA | A3 | A4 | A5 | A6 |
|---|---|---|---|---|---|
| 2 | 1.7492930E+00 | 0.0000000E+00 | −3.7881002E−02 | 2.7394353E−01 | −1.2524247E+00 |
| 3 | −4.4523794E+00 | 0.0000000E+00 | −6.3095377E−03 | −9.1301187E−02 | −4.5335513E−02 |
| 4 | −3.3532739E+02 | 0.0000000E+00 | −7.0416777E−02 | 4.8514553E−02 | 2.6576287E−02 |
| 5 | −1.9202039E+01 | 0.0000000E+00 | −3.1869943E−02 | 6.3761377E−02 | −1.1452742E−01 |
| 6 | 1.4884788E+01 | 0.0000000E+00 | −1.0186567E−01 | 1.8465532E−01 | −1.1617516E−01 |
| 7 | 1.8174546E+01 | 0.0000000E+00 | −1.3262877E−01 | 4.2982618E−01 | −6.3352212E−01 |
| 8 | −1.6430053E+02 | 0.0000000E+00 | −4.0840368E−01 | 6.2865735E−01 | −8.3101309E−02 |
| 9 | −1.6789934E−01 | 0.0000000E+00 | 1.2636458E−01 | 1.6846272E−01 | −4.4221173E−01 |
| 10 | −3.2013726E+00 | 0.0000000E+00 | 2.6715175E−01 | −2.0936661E−01 | −4.3797063E−02 |
| 11 | −5.6426851E+00 | 0.0000000E+00 | 1.2171591E−01 | −3.4686107E−02 | −1.3274056E−01 |
| 12 | −2.5647410E+01 | 0.0000000E+00 | 6.2198936E−02 | −1.2839227E−01 | 1.6088585E−02 |
| 13 | −3.4503748E+00 | 0.0000000E+00 | −3.3289740E−02 | −3.7176536E−02 | 2.9869893E−02 |

| | A7 | A8 | A9 | A10 | A11 |
|---|---|---|---|---|---|
| 2 | 3.0899290E+00 | −4.0672522E+00 | 1.8775409E+00 | 1.9866826E+00 | −3.2093933E+00 |
| 3 | 5.6988264E−01 | −7.4969497E−01 | −1.2055746E−01 | 8.2184172E−01 | −1.6461909E−01 |
| 4 | −1.3936248E−01 | 2.6210126E−01 | −1.2821923E−01 | −1.7370786E−01 | 1.6174882E−01 |
| 5 | 2.9082832E−01 | −3.5653666E−01 | 2.5797238E−01 | −1.6956246E−01 | −1.6528194E−02 |
| 6 | −2.9773106E−01 | 5.3440577E−01 | −2.1685698E−01 | −1.5628259E−01 | 1.3516401E−01 |
| 7 | 1.9023297E−01 | 4.0299744E−01 | −2.6519790E−01 | −1.8988911E−01 | 1.2236571E−01 |
| 8 | −4.6259080E−01 | 2.7753923E−01 | 5.9916880E−02 | −4.6277829E−02 | −4.3324485E−02 |
| 9 | 2.3233621E−01 | 9.5174682E−02 | −1.3174269E−01 | 2.0645943E−02 | 1.8371451E−02 |
| 10 | 2.6426259E−02 | 4.4663069E−02 | −2.0685669E−02 | −1.4762369E−03 | −1.6830858E−03 |
| 11 | 9.3466982E−02 | −3.3258603E−02 | 2.6100169E−02 | −1.5736448E−02 | 5.1462792E−03 |
| 12 | 4.0088944E−02 | −1.4124318E−02 | −1.1210090E−03 | 5.7886914E−04 | 1.1483421E−04 |
| 13 | 8.9278158E−03 | −1.1055401E−02 | 1.8906811E−03 | 2.8744556E−04 | 2.6321042E−05 |

| | A12 | A13 | A14 | A15 | A16 |
|---|---|---|---|---|---|
| 2 | 1.2247810E+00 | 5.9303572E−01 | −7.0053488E−01 | 2.3197331E−01 | −2.5638319E−02 |
| 3 | −6.1657465E−01 | 3.3743744E−01 | 1.7866516E−01 | −1.9521616E−01 | 4.5241488E−02 |
| 4 | 4.4945409E−02 | −7.0959798E−02 | 5.8443609E−03 | 8.8384393E−03 | −1.9761431E−03 |
| 5 | 2.8188640E−01 | −2.7819588E−01 | 6.0497037E−02 | 3.8924048E−02 | −1.5910162E−02 |
| 6 | −2.7140093E−02 | 4.5915878E−02 | −3.6041430E−02 | −9.8416442E−03 | 1.0542526E−02 |
| 7 | 1.3000822E−01 | −8.9200585E−02 | −2.2431086E−02 | 2.5443964E−02 | −4.1762152E−03 |
| 8 | 1.8152878E−02 | 1.3212051E−02 | −8.1668095E−03 | 9.2963147E−04 | 8.9463815E−05 |
| 9 | −1.4557773E−03 | −5.1630673E−03 | 1.6118870E−03 | 2.3337880E−05 | −4.1987354E−05 |
| 10 | 3.8623525E−03 | −2.1707981E−03 | 6.9903733E−04 | −1.3115260E−04 | 1.0385195E−05 |
| 11 | −2.5966386E−03 | 1.5479994E−03 | −4.6990473E−04 | 6.0517908E−05 | −2.2508002E−06 |
| 12 | 7.9285094E−05 | −7.5309207E−05 | 1.7824717E−05 | −1.4977064E−06 | 1.4552297E−08 |
| 13 | −4.8228308E−05 | 2.2293424E−06 | 1.2840374E−06 | 1.9616189E−08 | −2.6348499E−08 |

TABLE 7

Example 4
f = 4.841, Bf = 1.074, Fno. = 2.05, 2ω = 80.6

| Si | Ri | Di | Ndj | νdj |
|---|---|---|---|---|
| 1 (St) | ∞ | −0.127 | | |
| *2 | 2.47253 | 0.816 | 1.54488 | 54.87 |
| *3 | 9.22678 | 0.123 | | |
| *4 | 11.52862 | 0.308 | 1.63350 | 23.62 |
| *5 | 3.48100 | 0.259 | | |
| *6 | 5.96027 | 0.737 | 1.54488 | 54.87 |
| *7 | −7.88041 | 1.084 | | |
| *8 | −4.17527 | 0.500 | 1.54488 | 54.87 |
| *9 | −1.39378 | 0.055 | | |
| *10 | 255.57504 | 0.349 | 1.63350 | 23.62 |
| *11 | 6.74270 | 0.505 | | |
| *12 | −19.32071 | 0.267 | 1.54488 | 54.87 |
| *13 | 1.93353 | 0.582 | | |
| 14 | ∞ | 0.214 | 1.51633 | 64.14 |
| 15 | ∞ | 0.351 | | |
| 16 (IMG) | ∞ | | | |

*aspherical surface

TABLE 8

Example 4: Aspherical Surface Data

| Surface No. | KA | A3 | A4 | A5 | A6 |
|---|---|---|---|---|---|
| 2 | 1.7492930E+00 | −1.4368779E−03 | −1.6136410E−02 | 7.8182475E−02 | −3.8258422E−01 |
| 3 | −4.4523794E+00 | 3.0128326E−03 | −8.0120371E−02 | 3.4700596E−01 | −1.9060526E+00 |
| 4 | −3.3532739E+02 | 9.4088056E−06 | −8.7019646E−02 | 5.2671745E−04 | 3.3716938E−02 |
| 5 | −1.9202039E+01 | −2.8510556E−06 | −3.2619900E−02 | 2.3146515E−01 | −8.7729446E−02 |
| 6 | 1.4884788E+01 | 1.5464019E−04 | −8.7091146E−02 | 1.4978687E−01 | −1.5264388E−01 |

TABLE 8-continued

Example 4: Aspherical Surface Data

| | | | | | |
|---|---|---|---|---|---|
| 7 | 1.8174546E+01 | −3.2362990E−02 | 4.6495132E−01 | −3.7543317E+00 | 1.5762124E+01 |
| 8 | −1.6430053E+02 | 9.6008348E−04 | −4.4924005E−01 | 6.8644792E−01 | −2.3597212E−01 |
| 9 | −1.6789934E−01 | 2.0670531E−03 | 9.9251335E−02 | 2.8509513E−02 | −7.3911529E−01 |
| 10 | −3.2013726E+00 | 8.3100388E−04 | 2.4854503E−01 | −1.7158774E−01 | −1.0694036E−01 |
| 11 | −5.6426851E+00 | −1.7761484E−03 | 1.2438763E−01 | −7.9965865E−02 | −3.0422433E−02 |
| 12 | −2.5647410E+01 | −3.4689445E−04 | 7.3413425E−02 | −1.3728923E−01 | 3.2133394E−02 |
| 13 | −3.4503748E+00 | −1.0005698E−03 | −3.4316258E−02 | −5.3103300E−02 | 6.2483761E−02 |

| | A7 | A8 | A9 | A10 | A11 |
|---|---|---|---|---|---|
| 2 | 9.1673572E−01 | −9.2120854E−01 | −2.7572437E−01 | 1.3796476E+00 | −7.3345087E−01 |
| 3 | 5.3184298E+00 | −8.0032675E+00 | 6.0576513E+00 | −1.1465254E+00 | −6.2702133E−01 |
| 4 | −5.8349001E−02 | 1.6682655E−01 | −8.7054404E−02 | −7.2146824E−02 | −4.5932494E−02 |
| 5 | 2.3673052E+00 | −2.0369712E−01 | 1.7851898E−02 | 4.0260440E−02 | −4.6279577E−02 |
| 6 | −1.1551894E−01 | 2.4149277E−01 | 7.3041834E−02 | −3.8555110E−01 | 3.1864336E−01 |
| 7 | −3.8596297E+01 | 5.6358573E+01 | −4.4341025E+01 | 5.0230057E+00 | 2.7360987E+01 |
| 8 | −1.9016285E−01 | −1.7795813E−02 | 2.5507133E−01 | −1.1139532E−01 | −4.8310704E−02 |
| 9 | 6.8648734E−02 | −3.1450448E−01 | 5.7655969E−02 | 2.1229315E−02 | −3.1098737E−02 |
| 10 | 1.0661753E−01 | −1.3876035E−02 | 1.9252084E−03 | −5.1542333E−03 | 1.0176120E−04 |
| 11 | −1.2648506E−02 | 2.0649228E−02 | 2.4033616E−02 | −2.6844532E−02 | 7.3157986E−03 |
| 12 | 3.0328824E−02 | −2.1091103E−02 | 1.4052175E−02 | −1.0289870E−02 | 3.8143418E−03 |
| 13 | −2.3012476E−02 | 8.2280176E−03 | −5.1427016E−03 | 1.4949349E−03 | 1.2805758E−04 |

| | A12 | A13 | A14 | A15 | A16 |
|---|---|---|---|---|---|
| 2 | −6.6503753E−01 | 9.7059382E−01 | −4.1942928E−01 | 4.9393647E−02 | 6.7032301E−03 |
| 3 | −1.6217802E+00 | 3.1589566E+00 | −2.1310865E+00 | 6.6833600E−01 | −8.1847388E−02 |
| 4 | 1.9304082E−01 | −1.0184721E−01 | −1.4523084E−02 | 2.5238492E−02 | −5.8519956E−03 |
| 5 | 1.2812224E−01 | −8.7731010E−02 | −5.1698582E−02 | 7.2671512E−02 | −1.9735558E−02 |
| 6 | −1.9480034E−01 | 1.7834023E−01 | −1.0302350E−01 | 8.5639138E−03 | 8.4231199E−03 |
| 7 | −3.0617579E+01 | 1.6642951E+01 | −5.0267985E+00 | 7.7142527E−01 | −4.1053643E−02 |
| 8 | 3.3539280E−02 | 6.2107782E−03 | −6.6095480E−03 | 7.7182771E−04 | 8.9286019E−05 |
| 9 | 2.1116101E−02 | −6.2410344E−03 | −5.8922931E−04 | 7.3435287E−04 | −1.1294691E−04 |
| 10 | 8.2558612E−04 | −1.2110395E−04 | 1.0964147E−05 | −1.2840366E−05 | 2.1228128E−06 |
| 11 | 9.1141180E−04 | −1.1005297E−03 | 3.7054499E−04 | −7.2191019E−05 | 6.3345231E−06 |
| 12 | −1.7865920E−04 | −3.4147837E−04 | 1.2170013E−04 | −1.7737861E−05 | 9.9456704E−07 |
| 13 | −1.3848137E−04 | 1.6366563E−05 | 1.5652627E−06 | −2.7084684E−07 | −4.1045830E−09 |

TABLE 9

Example 5
f = 4.687, Bf = 0.938, Fno. = 2.05, 2ω = 82.8

| Si | Ri | Di | Ndj | νdj |
|---|---|---|---|---|
| 1 (St) | ∞ | −0.143 | | |
| *2 | 2.44441 | 0.800 | 1.54488 | 54.87 |
| *3 | 3543.52402 | 0.108 | | |
| *4 | 9.43068 | 0.366 | 1.63350 | 23.62 |
| *5 | 3.32772 | 0.539 | | |
| *6 | 15.16788 | 0.570 | 1.54488 | 54.87 |
| *7 | 32.54852 | 0.562 | | |
| *8 | −5.27571 | 0.821 | 1.54488 | 54.87 |
| *9 | −1.16199 | 0.467 | | |
| *10 | −1009.08174 | 0.293 | 1.63350 | 23.62 |
| *11 | | 1.93522 | 0.359 | |
| *12 | −33.34334 | 0.300 | 1.54488 | 54.87 |
| *13 | 7.70023 | 0.654 | | |
| 14 | ∞ | 0.210 | 1.51633 | 64.14 |
| 15 | ∞ | 0.146 | | |
| 16 (IMG) | ∞ | | | |

*aspherical surface

TABLE 10

Example 5: Aspherical Surface Data

| Surface No. | KA | A3 | A4 | A5 | A6 |
|---|---|---|---|---|---|
| 2 | 1.7492930E+00 | 8.3124401E−05 | −3.0939476E−02 | 1.8305347E−01 | −7.8693618E−01 |
| 3 | −4.4523794E+00 | 2.4046736E−05 | −2.5205225E−02 | −3.2936802E−02 | −2.2233798E−02 |
| 4 | −3.3532739E+02 | 4.5558157E−05 | −2.2209869E−03 | −3.1275062E−02 | 7.0561383E−02 |
| 5 | −1.9202039E+01 | −3.6421728E−05 | 4.3044798E−02 | −1.1823558E−03 | −3.4308618E−02 |
| 6 | 1.4884788E+01 | −2.5411067E−05 | −6.8520152E−02 | 5.3733216E−02 | −1.6998240E−02 |
| 7 | 1.8174546E+01 | 1.2934007E−04 | −8.1150572E−02 | 2.5089960E−01 | −4.0023686E−01 |
| 8 | −1.6430053E+02 | −5.1766699E−04 | −1.5320772E−01 | 1.9926307E−01 | 1.2163235E−01 |
| 9 | −1.6789934E−01 | −4.4291447E−05 | 1.5379992E−01 | 6.0586228E−02 | −2.2077583E−01 |
| 10 | −3.2013726E+00 | 2.9451110E−03 | 1.5031146E−01 | −7.6725395E−02 | −1.4116344E−01 |
| 11 | −5.6426851E+00 | −1.1581717E−03 | 1.0416683E−02 | −2.2682501E−02 | −2.0020921E−02 |

TABLE 10-continued

Example 5: Aspherical Surface Data

| | | | | | |
|---|---|---|---|---|---|
| 12 | -2.5647410E+01 | -6.1837195E-03 | 1.0821364E-01 | -2.7677365E-01 | 3.8519772E-01 |
| 13 | -3.4503748E+00 | 3.6937096E-03 | 5.1961443E-03 | 3.4367438E-02 | -1.1454665E-01 |

| | A7 | A8 | A9 | A10 | A11 |
|---|---|---|---|---|---|
| 2 | 1.8795379E+00 | -2.6670865E+00 | 2.2013029E+00 | -9.1279475E-01 | 6.0800650E-03 |
| 3 | 3.0773198E-01 | -4.2171876E-01 | 9.9363630E-02 | 1.0133098E-01 | 1.0262043E-01 |
| 4 | -3.0868922E-02 | -2.3314212E-02 | 7.2828759E-02 | -9.2586650E-02 | 1.8497360E-02 |
| 5 | 6.7360151E-02 | 8.3970211E-03 | -1.1488685E-01 | 1.1429983E-01 | -5.8454871E-02 |
| 6 | -1.7496222E-01 | 2.6513061E-01 | -9.7334034E-02 | -6.6176537E-02 | 4.3090751E-02 |
| 7 | 1.9877824E-01 | 8.1942467E-02 | -1.1706667E-01 | 6.5327711E-02 | -9.4913966E-02 |
| 8 | -3.8083887E-01 | 2.4837881E-01 | -3.6606052E-02 | -2.4061906E-02 | 1.0078937E-02 |
| 9 | 7.4912013E-02 | 7.7436732E-02 | -5.7788608E-02 | -8.0729532E-03 | 1.4087824E-02 |
| 10 | 1.1826201E-01 | -1.2733113E-02 | -2.4807359E-02 | 1.6955224E-02 | -2.2792829E-03 |
| 11 | -1.0446597E-02 | 2.2209709E-02 | -4.2840479E-03 | -1.8806480E-03 | 3.4060591E-04 |
| 12 | -4.2215301E-01 | 3.2295457E-01 | -1.5565174E-01 | 4.2544715E-02 | -3.7192892E-03 |
| 13 | 1.3158521E-01 | -8.1365387E-02 | 2.9155215E-02 | -5.8925007E-03 | 7.7155704E-04 |

| | A12 | A13 | A14 | A15 | A16 |
|---|---|---|---|---|---|
| 2 | 2.1905740E-01 | -1.9664017E-01 | 1.3498331E-01 | -5.6110653E-02 | 9.4340450E-03 |
| 3 | -2.3332429E-01 | 7.9207351E-02 | 5.7209647E-02 | -4.8199593E-02 | 1.0148038E-02 |
| 4 | 4.5381004E-02 | -1.9448317E-02 | -1.2138292E-02 | 8.0399624E-03 | -8.5917458E-04 |
| 5 | 2.6060268E-02 | 6.6358145E-03 | -2.9496211E-02 | 2.0314346E-02 | -4.6189146E-03 |
| 6 | 2.6028858E-02 | -3.5395435E-02 | 2.1364176E-02 | -1.1278518E-02 | 3.2847622E-03 |
| 7 | 8.2992663E-02 | -9.6519554E-03 | -2.2245911E-02 | 1.1177919E-02 | -1.5734645E-03 |
| 8 | -2.5595891E-04 | -2.5477628E-03 | 2.2952774E-03 | -8.4865699E-04 | 1.1525972E-04 |
| 9 | 5.6000982E-03 | -9.9083095E-03 | 4.4554184E-03 | -9.6385508E-04 | 9.7829454E-05 |
| 10 | -3.5142262E-03 | 2.4359676E-03 | -7.1120563E-04 | 1.0206641E-04 | -5.9201903E-06 |
| 11 | 1.3099581E-04 | -1.9302097E-05 | 2.3098386E-06 | -2.7441435E-06 | 4.4993814E-07 |
| 12 | -1.4863239E-03 | 5.6856219E-04 | -8.1945798E-05 | 4.7970427E-06 | -3.5237919E-08 |
| 13 | -2.7465251E-04 | 1.4103037E-04 | -3.8378858E-05 | 5.1662522E-06 | -2.7808429E-07 |

TABLE 11

Values Related to Conditional Formulae

| Formula | Condition | Example 1 | Example 2 | Example 3 | Example 4 | Example 5 |
|---|---|---|---|---|---|---|
| 1 | f/f3 | -0.001 | 0.256 | 0.452 | 0.763 | 0.091 |
| 2 | f/f5 | -0.206 | -0.468 | -0.298 | -0.443 | -1.538 |
| 3 | f4/f5 | -0.156 | -0.350 | -0.245 | -0.330 | -0.838 |
| 4 | f/f2 | -0.550 | -0.669 | -0.543 | -0.518 | -0.540 |
| 5 | f/f4 | 1.321 | 1.338 | 1.215 | 1.341 | 1.835 |
| 6 | f/f1 | 1.236 | 1.209 | 0.946 | 0.814 | 1.044 |
| 7 | f · P34 | -0.953 | -0.765 | -0.482 | -0.345 | -0.647 |
| 8 | (L4r + L4f)/(L4r - L4f) | -2.102 | -2.019 | -2.049 | -2.002 | -1.565 |

Note that the above paraxial radii of curvature, the distances among surfaces, the refractive indices, and the Abbe's numbers were obtained by measurements performed by specialists in the field of optical measurement, according to the methods described below.

The paraxial radii of curvature were obtained by measuring the lenses using an ultra high precision three dimensional measurement device UA3P (by Panasonic Factory Solutions K. K.) by the following procedures. A paraxial radius of curvature $R_m$ (m is a natural number) and a conical coefficient $K_m$ are preliminarily set and input into UA3P, and an nth order aspherical surface coefficient An of an aspherical shape formula is calculated from the input paraxial radius of curvature $R_m$ and conical coefficient $K_m$ and the measured data, using a fitting function of UA3P. $C=1/R_m$ and $KA=K_m-1$ are considered in the aforementioned aspherical surface shape formula (A). Depths Z of an aspherical surface in the direction of the optical axis corresponding to heights h from the optical axis are calculated from $R_m$, $K_m$, An, and the aspherical surface shape formula. The difference between the calculated depths Z and actually measured depth values Z' are obtained for each height h from the optical axis. Whether the difference is within a predetermined range is judged. In the case that the difference is within the predetermined range, $R_m$ is designated as the paraxial radius of curvature. On the other hand, in the case that the difference is outside the predetermined range, the value of at least one of $R_m$ and $K_m$ is changed, set as $R_{m+1}$ and $K_{m+1}$, and input to UA3P. The processes described above are performed, and judgment regarding whether the difference between the calculated depths Z and actually measured depth values Z' for each height h from the optical axis is within a predetermined range is judged. These procedures are repeated until the difference between the calculated depths Z and actually measured depth values Z' for each height h from the optical axis is within a predetermined range. Note that here, the predetermined range is set to be 200 nm or less. In addition, a range from 0 to ⅕ the maximum lens outer diameter is set as the range of h.

The distances among surfaces are obtained by measurements using OptiSurf (by Trioptics), which is an apparatus for measuring the central thicknesses and distances between surfaces of paired lenses.

The refractive indices are obtained by performing measurements in a state in which the temperature of a measurement target is 25° C., using KPR-2000 (by K. K. Shimadzu), which is a precision refractometer. The refractive index measured with respect to the d line (wavelength: 587.6 nm) is designated as Nd. Similarly, the refractive index measured with respect to the e line (wavelength: 546.1 nm) is designated as Ne, the refractive index measured with respect to the F line (wavelength: 486.1 nm) is designated as NF, the refractive index measured with respect to the C line (wavelength: 656.3 nm) is designated as NC, and the refractive index measured with respect to the g line (wavelength: 435.8 nm) is designated as Ng. The Abbe's number vd with respect to the d line is obtained by calculations, substituting the values of Nd, NF, and NC obtained by the above measurements into the formula below.

$$vd=(Nd-1)/(NF-NC)$$

What is claimed is:

1. An imaging lens consisting essentially of six lenses, including:
   a first lens having a positive refractive power and is of a meniscus shape with a convex surface toward the object side;
   a second lens having a negative refractive power;
   a third lens;
   a fourth lens having a positive refractive power;
   a fifth lens having a negative refractive power and a concave surface toward the image side; and
   a sixth lens of a biconcave shape, provided in this order from the object side;
   the imaging lens satisfying the following conditional formula:

$$-0.25<f/f3<1 \tag{1}$$

wherein f is the focal length of the entire system, and f3 is the focal length of the third lens, and
   the imaging lens satisfying the following conditional formula:

$$1.2<f/f4<1.95 \tag{5-2}$$

wherein f4 is the focal length of the fourth lens.

2. An imaging lens as defined in claim 1 that further satisfies the conditional formula below:

$$-3.5<f/f5<0 \tag{2}$$

wherein f5 is the focal length of the fifth lens.

3. An imaging lens as defined in claim 1 that further satisfies the conditional formula below:

$$-4<f4/f5<0 \tag{3}$$

wherein f4 is the focal length of the fourth lens, and f5 is the focal length of the fifth lens.

4. An imaging lens as defined in claim 1 that further satisfies the conditional formula below:

$$-2<f/f2<0 \tag{4}$$

wherein f2 is the focal length of the second lens.

5. An imaging lens as defined in claim 1 that further satisfies the conditional formula below:

$$0.7<f/f1<2 \tag{6}$$

wherein f1 is the focal length of the first lens.

6. An imaging lens as defined in claim 1 that further satisfies the conditional formula below:

$$-3<f \cdot P34<0 \tag{7}$$

wherein P34 is the refractive power of an air gap formed between the surface of the third lens toward the image side and the surface of the fourth lens toward the object side, the refractive power of the air gap being obtained by Formula (P) below:

$$P34 = \frac{1-Nd3}{L3r} + \frac{Nd4-1}{L4f} - \frac{(1-Nd3)\times(Nd4-1)\times D7}{L3r \times L4f} \tag{P}$$

wherein Nd3 is the refractive index of the third lens with respect to the d line, Nd4 is the refractive index of the fourth lens with respect to the d line, L3r is the paraxial radius of curvature of the surface of the third lens toward the image side, L4f is the paraxial radius of curvature of the surface of the fourth lens toward the object side, and D7 is an air space distance between the third lens and the fourth lens along the optical axis.

7. An imaging lens as defined in claim 1 that further satisfies the conditional formula below:

$$-10<(L4r+L4f)/(L4r-L4f)<4 \tag{8}$$

wherein L4f is the paraxial radius of curvature of the surface of the fourth lens toward the object side, and L4r is the paraxial radius of curvature of the surface of the fourth lens toward the image side.

8. An imaging lens as defined in claim 1, further comprising:
   an aperture stop positioned at the object side of the surface of the first lens toward the object side.

9. An imaging lens as defined in claim 1 that further satisfies the conditional formula below:

$$-0.24<f/f3<0.8 \tag{1-1}$$

10. An imaging lens as defined in claim 1 that further satisfies the conditional formula below:

$$-2.5<f/f5<0 \tag{2-1}$$

wherein f5 is the focal length of the fifth lens.

11. An imaging lens as defined in claim 1 that further satisfies the conditional formula below:

$$-2<f4/f5<0 \tag{3-1}$$

wherein f4 is the focal length of the fourth lens and f5 is the focal length of the fifth lens.

12. An imaging lens as defined in claim 1 that further satisfies the conditional formula below:

$$-1<f/f2<-0.3 \tag{4-1}$$

wherein f2 is the focal length of the second lens.

13. An imaging lens as defined in claim 1 that further satisfies the conditional formula below:

$$0.81<f/f1<1.5 \tag{6-1}$$

wherein f1 is the focal length of the first lens.

14. An imaging lens as defined in claim 1 that further satisfies the conditional formula below:

$$-1.5<f \cdot P34<-0.2 \tag{7-1}$$

wherein P34 is the refractive power of an air gap formed between the surface of the third lens toward the image side and the surface of the fourth lens toward the object side, the refractive power of the air gap being obtained by Formula (P) below:

$$P34 = \frac{1-Nd3}{L3r} + \frac{Nd4-1}{L4f} - \frac{(1-Nd3)\times(Nd4-1)\times D7}{L3r \times L4f} \tag{P}$$

wherein Nd3 is the refractive index of the third lens with respect to the d line, Nd4 is the refractive index of the fourth lens with respect to the d line, L3r is the paraxial radius of curvature of the surface of the third lens toward the image side, L4f is the paraxial radius of curvature of the surface of the fourth lens toward the object side, and D7 is an air space distance between the third lens and the fourth lens along the optical axis.

15. An imaging lens as defined in claim 1 that further satisfies the conditional formula below:

$$-5<(L4r+L4f)/(L4r-L4f)<0 \tag{8-1}$$

wherein L4f is the paraxial radius of curvature of the surface of the fourth lens toward the object side, and L4r is the paraxial radius of curvature of the surface of the fourth lens toward the image side.

16. An imaging lens as defined in claim 1 that further satisfies the conditional formula below:

$$-0.23 < f/f3 < 0.46 \qquad (1\text{-}2).$$

17. An imaging apparatus equipped with an imaging lens as defined in claim 1.

* * * * *